(12) United States Patent
Thulasi et al.

(10) Patent No.: US 11,588,910 B2
(45) Date of Patent: Feb. 21, 2023

(54) OFFLOADING VISUAL FRAMES TO A GATEWAY DEVICE

(71) Applicant: Meta Platforms Technologies, LLC, Menlo Park, CA (US)

(72) Inventors: Arun Thulasi, San Ramon, CA (US); Pranav Saxena, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/694,286

(22) Filed: Mar. 14, 2022

(65) Prior Publication Data

US 2022/0247828 A1     Aug. 4, 2022

(51) Int. Cl.
*H04L 67/51* (2022.01)
*H04L 67/1021* (2022.01)
*H04L 67/1008* (2022.01)
*G06T 7/20* (2017.01)

(52) U.S. Cl.
CPC ............... *H04L 67/51* (2022.05); *G06T 7/20* (2013.01); *H04L 67/1008* (2013.01); *H04L 67/1021* (2013.01); *G06T 2200/04* (2013.01); *G06T 2207/10021* (2013.01)

(58) Field of Classification Search
None
See application file for complete search history.

(56) References Cited

U.S. PATENT DOCUMENTS

| 8,885,466 | B1* | 11/2014 | Seleznyov | H04W 4/50 370/229 |
|---|---|---|---|---|
| 9,467,923 | B2* | 10/2016 | Karaoguz | H04W 36/32 |
| 9,736,703 | B2* | 8/2017 | Goldsmith | H04W 24/02 |
| 10,452,444 | B1* | 10/2019 | Jibaja | G06F 3/0665 |
| 2009/0156221 | A1* | 6/2009 | Bae | H04W 36/30 455/436 |
| 2010/0248725 | A1* | 9/2010 | Yang | H04W 36/08 455/436 |

(Continued)

OTHER PUBLICATIONS

Mangiante S., et al., "VR is on the Edge: How to Deliver 360° Videos in Mobile Networks," Research Gate, In Proceedings of VR/AR Network 2017, Aug. 25, 2017, 7 pages.

*Primary Examiner* — Backhean Tiv
(74) *Attorney, Agent, or Firm* — Potomac Law Group, PLLC

(57) ABSTRACT

Implementations offload visual frames from a client device to a gateway or edge device for processing. The client device can receive streaming visual frames and a request to process the visual frames using a data service. The client device can offload visual frames to a gateway or edge device preloaded with a resource that corresponds to the requested data service. After the gateway or edge device processes the visual frames using the resource, the processed visual frames can be returned to the client device. In implementations, the offload device and client device are situated in a network such that a latency for the offload communications supports real-time video display. A gateway device manager can locate a gateway connected to the client device, and resources can be deployed (or the gateway can be prepopulated) so that the device can perform gateway services and edge processing services for the client device.

20 Claims, 14 Drawing Sheets

(56) References Cited

U.S. PATENT DOCUMENTS

| | | | |
|---|---|---|---|
| 2011/0250895 A1* | 10/2011 | Wohlert | H04W 40/20 455/445 |
| 2015/0017985 A1* | 1/2015 | Safavi | H04W 36/0085 455/436 |
| 2015/0036663 A1* | 2/2015 | Kilpatrick, II | H04W 36/00837 370/332 |
| 2015/0065135 A1* | 3/2015 | Claussen | H04W 36/00837 455/436 |
| 2015/0304913 A1* | 10/2015 | Uusitalo | H04W 36/04 455/444 |
| 2016/0309360 A1* | 10/2016 | Noldus | H04W 36/00837 |
| 2018/0102985 A1* | 4/2018 | Byers | H04L 47/80 |
| 2018/0184350 A1* | 6/2018 | Hassan | H04H 60/45 |
| 2018/0295546 A1* | 10/2018 | Crawford | H04L 67/148 |
| 2019/0324800 A1* | 10/2019 | Chhabra | G06F 9/5027 |
| 2019/0373521 A1* | 12/2019 | Crawford | H04L 67/104 |
| 2021/0250838 A1* | 8/2021 | Lu | H04W 36/08 |
| 2022/0180639 A1* | 6/2022 | Ono | H04N 5/232 |
| 2022/0245903 A1* | 8/2022 | Saxena | G06F 9/5016 |
| 2022/0245904 A1* | 8/2022 | Saxena | G06F 9/5016 |
| 2022/0247828 A1* | 8/2022 | Thulasi | H04W 4/027 |
| 2022/0247970 A1* | 8/2022 | Thulasi | H04N 7/183 |
| 2022/0255988 A1* | 8/2022 | Salmasi | G06F 9/45558 |
| 2022/0311678 A1* | 9/2022 | Karjee | H04L 41/16 |

* cited by examiner

US 11,588,910 B2

OFFLOADING VISUAL FRAMES TO A GATEWAY DEVICE

CROSS-REFERENCE TO RELATED APPLICATION(S)

This application is U.S. patent application Ser. No. 17/694,277, titled "Offloading Visual Frames to a Gateway Device;" and to U.S. patent application Ser. No. 17/694,241, titled "Selective Offload of Workloads to Edge Devices;" and to U.S. patent application Ser. No. 17/694,262, titled "Selective Offload of Workloads to Edge Devices;" each filed on Mar. 14, 2022, and each is herein incorporated by reference in its entirety.

TECHNICAL FIELD

The present disclosure is directed to offloading visual frames to a gateway device for processing.

BACKGROUND

Client devices, such as smartphones, have progressively gained compute power and functionality over time. However, additional classes of client devices, such as wearable devices, smart speakers, Internet of Things ("IoT") connected devices, and the like, have created a variety of capabilities where some client devices are capable of certain compute workloads that other client devices are not. In addition, client devices are increasingly relied upon to deliver sophisticated services to users, such as artificial reality environments and video processing. Techniques that can improve the delivery of sophisticated services at client devices with different levels of computing power can provide substantial value to users and service providers.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
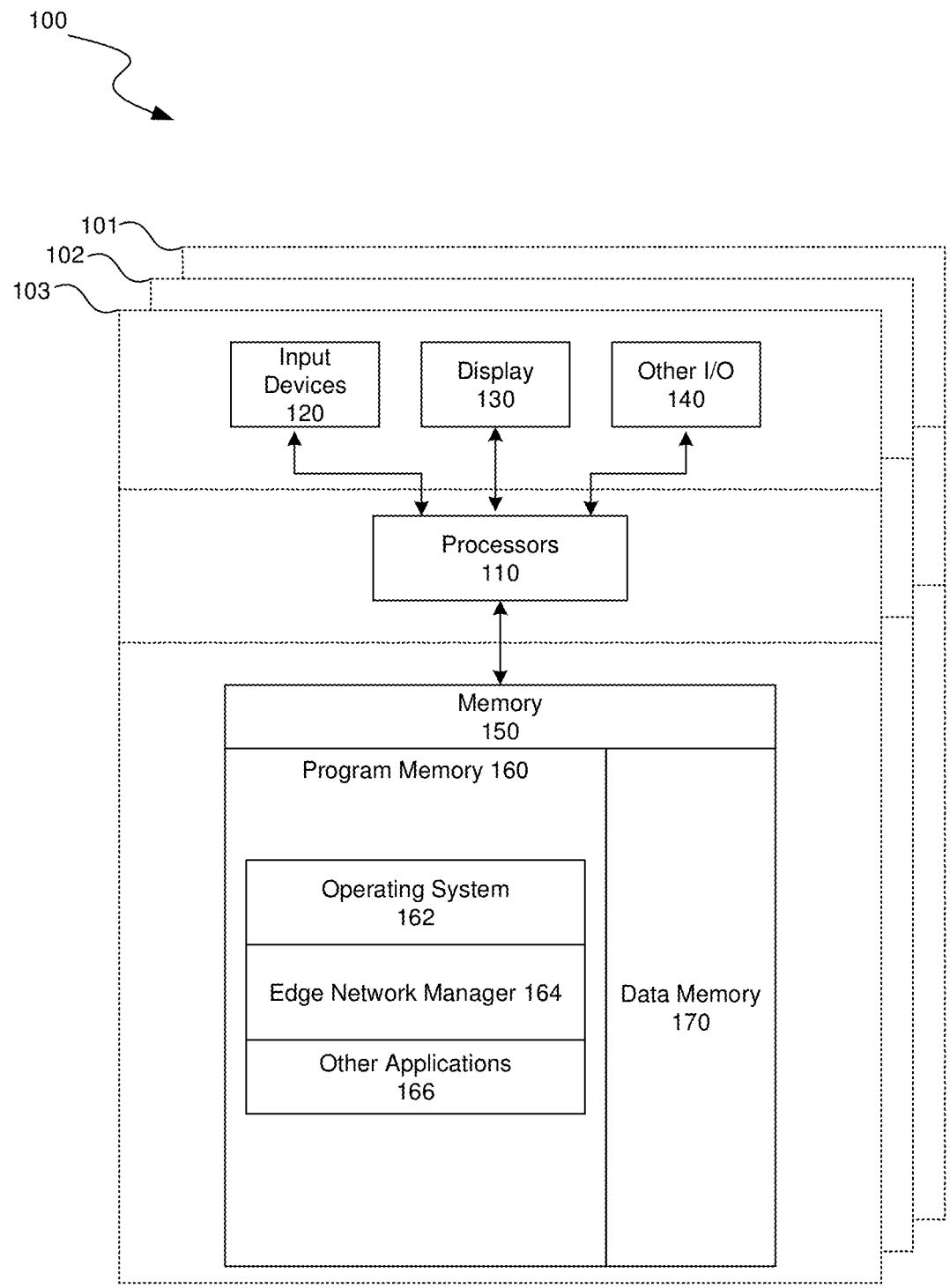
FIG. 1 is a block diagram illustrating an overview of devices on which some implementations of the present technology can operate.

Aspects of the present disclosure are directed to offloading visual frames over a wireless communication network to a network edge device for processing. For example, a client system can include a wireless networking component and a sensor (e.g., camera) for capturing visual frames. The client system can be connected to the wireless communication network (e.g., Wi-Fi network, cellular network, and the like) via a connection between the wireless networking component and an access point (e.g., access node) for the wireless communication network. Implementations of an edge network manager can offload visual frames captured at the client system over the wireless communication network (via the wireless networking component) to an edge network device configured to perform a workload on the visual frames that corresponds to a requested data service.

In some implementations, the edge network device is a multipurpose device. For example, the edge network device can perform gateway functions for the client system (e.g., serve as a gateway to a data network) and provide data services for processing the offloaded visual frames. In some implementations, the gateway functions include connecting the client system to a data network, (e.g., routing network traffic to/from the client system over the data network), such as a packet data network. For example, the gateway functions can include packet core functionality (e.g., generating data packets according to a protocol of the packet data network). In some implementations, the data network can be separate from the wireless network, such as a data network implemented by an organization or a public data network (e.g., the Internet). These example implementations represent an edge network device operating at a data network edge.

In some implementations, the gateway functions include connecting the client system to a data network that is part of the wireless network, such as the backend data network (e.g., backhaul traffic network). For example, the edge network device can be part of a radio device (e.g., access node) for a wireless network provider. The radio device can wirelessly communicate data to the client system and receive data from the client system (e.g., via the wireless network component) according to any suitable wireless communication protocol (e.g., Wi-Fi, Third Generation ("3G"), Fourth Generation ("4G"), and/or Fifth Generation ("5G") cellular standard, or other suitable wireless communication protocols). The radio device (e.g., edge network device part of the radio device) can also perform gateway functions for the client system (e.g., serve as a gateway to the backend data network for the wireless network) and provide data services for processing offloaded visual frames. These example implementations represent an edge network device operating at a wireless network radio edge.

Implementations of client devices and/or client systems (e.g., client mobile devices, XR devices, wearable devices, etc.) include components to capture visual frames, such as streaming video. Different classes of client devices/systems can have different compute power. Accordingly, applications running on these client devices/systems can encounter different client device capabilities. In addition, applications implemented at client devices are increasing in complexity, such as applications that render artificial reality environments.

Implementations of the edge network manager offload visual frames from the client system to a network edge device that provides the client system gateway services. For example, a network edge manager can offload a visual frame to a network edge device loaded with a workload resource configured to process the visual frame. Example processing can include object/segment tracking for objects in the visual frames; generative adversarial network ("GAN") processing; augmenting the visual frames with masks, overlays, images, three-dimensional volumes, etc.; artificial reality video processing for the visual frames; three-dimensional mapped environment video processing for the visual frames; or other suitable processing. After the processing, the network edge device can return the processed visual frame to the client system. In some implementations, the network edge device and client system are situated in a network such that the latency for the offload communication supports real-time video display.

Implementations of the network manager determine a device for requested data services according to gateway device capabilities. For example, a client system can request a data service that corresponds to a workload resource for performing the data service on visual frames. The edge network manager can locate a gateway device to which the client system can connect. For example, the gateway device can provide gateway functions for the client system (e.g., routing the client system's data over a data communication network according to a networking protocol). The network manager can determine whether one or more metrics for the located gateway device meet a service criteria for the requested data service. Example criteria can include a resource criteria for performing the data service (e.g., one or more of workload resources), a latency criteria (e.g., 15 milliseconds, 20 milliseconds, 30 milliseconds, 40 milliseconds, and the like), a processing power criteria (e.g., threshold on-device processing power), and other suitable criteria.

In some implementations, a listing of workload resources at the gateway device can be compared to the service criteria to determine whether the gateway device is preloaded with a resource that corresponds to the requested data service. In an example, when the listing of workload resources does not meet the service criteria, another device can be selected for the requested data service (e.g., an edge device other than the located gateway device). In another example, when the listing of workload resources does not meet the service criteria, the gateway device can be dynamically loaded with the corresponding workload resource to meet the service criteria.

Some implementations can compare a processing metric for the gateway device to the service criteria for the requested data service (e.g., processing power criteria). Example processing metrics include a processing power metric for the gateway device (e.g., combination of speed, number of cores, cache memory, and other suitable parameters that reflect the processing power of a computing device), capacity metric for the gateway device (e.g., processor utilization, memory utilization, and the like), latency parameter, and other suitable metrics.

In some implementations, when the listing of workload resources at the gateway device meets the service criteria for the requested data service and/or the processing metric for the gateway device meets the service criteria, an additional comparison can be performed that compares the processing power criteria of the requested data service to a utilization metric for the gateway device (e.g., processor utilization, memory utilization, and the like). For example, the processing power criteria can indicate a quantity of resources for performing the requested data service, and a gateway device may not have these resources available when under certain utilization conditions (e.g., high load). In this example, the processing power criteria can be translated to a predicted gateway device utilization, and when the utilization metric fails to meet the predicted gateway device utilization, the gateway device metric(s) may fail to meet the service criteria for the requested data service.

When metrics for the gateway device meet the service criteria for the requested data service, implementations of the edge network manager can initialize data services at the gateway device. For example, an engine and one or more workload resources can be initialized to receive and process visual frames. In some implementations, a gateway device can be dynamically loaded with a workload resource to meet the service criteria (e.g., a workload resource for performing a workload that corresponds to the requested data service). The workload resources can be sent to the gateway device, or the gateway device can receive instructions (and a network address) to retrieve the workload resource.

Once the resources are loaded and initialized, the gateway device can receive offloaded visual frames from the client system for processing. The gateway device can use the initialized resources to perform a workload on the offloaded visual frames (e.g., to perform the requested data service). The processed frames can be returned to the client system from the gateway device. At the client system, the processed frames can be displayed as streaming video.

When metrics for the gateway device do not meet the service criteria for the requested data service, implementations of the edge network manager can compare service criteria for additional edge devices to the service criteria. For example, the additional edge devices can be devices within a predetermined distance from the client system and/or edge devices capable of meeting a latency criteria when communicating with the wireless system. A listing of workload resources at the edge devices can be compared to the service criteria for the requested data service, one or more processing metrics for the edge devices can be compared to the service criteria, and/or one or more utilization metrics for the edge devices can be compared to the service criteria.

In some implementations, when metrics for at least one edge device meet the service criteria for the requested data service, implementations of the edge network manager can select the edge device for the data service and initialize data services at the selected edge device. For example, an engine and one or more workload resources can be initialized to receive and process visual frames. Once the resources are loaded and initialized, the selected edge device can receive offloaded visual frames from the client system for processing. The edge device can use the initialized resources to perform a workload on the offloaded visual frames (e.g., to perform the requested data service). The processed frames can be returned to the client system from the edge device. At the client system, the processed frames can be displayed as streaming video. In some implementations, when an edge device with metrics that meet the service criteria is not available, the edge manager can instruct the client system to perform the data services on-device or at a cloud device.

Implementations of the edge network manager can also distribute workload resources among edge systems and/or cloud systems. For example, the edge manager (e.g., on a cloud system) can track services rendered at client devices, such as data services rendered via performance of a workload on a stream of visual frames. Example tracked data services include object tracking for objects in the visual frames; generating overlays, masks, images, or three-dimensional volumes for augmenting the visual frames; generative adversarial network ("GAN") processing; artificial reality video processing for the visual frames; three-dimensional mapped environment video processing for the visual frames; or other suitable data services. For example, for a given gateway device, the edge network manager can access data service usage for the client systems connected to the given gateway device.

Based on the tracking, the edge network manager can preload edge devices/gateway devices with workload resources (e.g., trained machine learning model, 2D or 3D models and other content items, body kinematic models, or other suitable computing resources) that correspond to one or more of the tracked data services. Using the preloaded workload resources the edge devices/gateway devices can perform data services for applications running at client devices. For example, the preloaded workload resources can configure the edge devices/gateway devices to: a) receive offloaded visual frames from the client devices, b) process the offloaded visual frames using the preloaded workload resources to perform the selected data services, and c) return the processed visual frames to the client devices for display.

Implementations of the edge network manager also track load metric(s) for gateway devices. Example load metrics include processor utilization, memory utilization, client system connection load, and other suitable load metrics. The load metric(s) can be compared to load criteria (e.g., processor threshold, memory threshold, client system connection threshold, and the like). When the load metric(s) for a gateway device meet the load criteria, a new gateway can be provisioned. For example, a gateway can be provisioned at a server or other suitable network connected computing device. In some implementations, a subset of the client system connections for the existing gateway device can be selected for transition to the newly provisioned gateway.

Based on the subset of client systems selected for transition, edge network manager can preload resources (e.g., effects engine, workload resources, and the like) to the newly provisioned gateway. For example, transitioning client systems may have in-progress data services that are received from the existing gateway device (or another edge device) and resources that correspond to these in-progress data services can be preloaded to the provisioned gateway device. In another example, the subset of client system's usage history for data services can be accessed, and resources can be preloaded to the newly provisioned gateway based on the usage history.

The edge network manager can initialize resources loaded at the newly provisioned gateway that correspond to any in-progress data services received by the subset of client systems. The edge network manager can then transition the client systems to the newly provisioned gateway. For example, the transition for in-progress data services can be similar to a handover of data services from a first gateway device/edge device to a second gateway device/edge device. In some implementations, endpoints for one or more logical connections for the client systems can be transitioned to the newly provisioned gateway so that the new gateway performs gateway functions for the client systems and workloads on visual frames offloaded from the client systems.

The edge network manager can also cause a handover of in-progress data services from a first edge device/gateway device to a second edge device/gateway device. For example, a client system's location and movement metric (e.g., velocity vector over time) can be used to determine a predicted location for the client system. The edge network manager may initialize a handover of the in-progress data services for the client system when the client system approaches the predicted location, which can include selecting a second gateway device/edge device for the handover and initializing data services at the second device. For example, the second gateway device/edge device can be selected based on the predicted location for the client system, the in-progress data services for the client system in comparison to preloaded resources at the second gateway device/edge device, a comparison of metric(s) for the second device and a service criteria for the in-progress data service, and other suitable comparisons or data items.

The edge network manager can the instruct the client system to perform a handover of the data service from the gateway device/edge device to the second gateway device/edge device (e.g., when the client system has moved such that the first gateway device/edge device can no longer provide acceptable service and/or when the second gateway device/edge device can provide better service). The client system can establish a connection (e.g., real-time communication session) with the second gateway device/edge device based on the network address included in the instruction. Captured visual frames at the client system can then be offloaded to both the first gateway device/edge device and the second gateway device/edge device. For example, a first portion of visual frames can be offloaded to the first device and as second portion of visual frames can be offloaded to the second device. In some implementations, the first portion of frames and second portions of frames include at least some redundant visual frames.

The first gateway device/edge device can receive the first portion of offloaded visual frames and perform a workload on the visual frames that corresponds to the in-progress data services for the client system and the second gateway device/edge device can receive the second portion of offloaded visual frames and perform the workload on the visual frames that corresponds to the in-progress data services. Both gateway devices/edge devices can transmit the processed visual frames to the client system. In some implementations, the client system can discard processed frames received that are redundant. The processed visual frames can be displayed at the client system as streaming video.

In some implementations, once a termination criteria is met by the communication with the second gateway device/edge device, the communication session with the first gateway device/edge device can be terminated. For example, once a latency for the communication with the second device meets a criteria (e.g., is below a threshold, is less than a latency for the first device, and the like), the communication session with the first device can be terminated.

Some implementations include a client device, an edge device, a gateway device, and/or a cloud device. As used herein, a "device" can be a system or one or more discrete but connected/networked physical components such as a cloud device can include one or more servers working in concert. An edge device can be any device that is capable of meeting a latency criteria when communicating with the client device, such as 20 ms. The edge device can be at a location that is within a threshold distance (e.g., 1, 5, or 50 miles) from the client device, may have a connection capability relative to the client device that meets the latency criteria when a real-time communication session is established, or may otherwise be situated to meet the latency criteria.

An edge device can be a network edge device, such as a gateway device, or a personal edge device. For example, a network edge device can be located remote from the client device (e.g., off-premises). In addition, a user may own and/or manage the client device while an external party (e.g., third-party organization) may manage the network edge device. In some situations, a network edge device can be primarily stationary. A connection between the network edge device and the client device can also traverse a mixed network. For example, the connection between the network edge device and the client device may include a wireless communication link (e.g., a Wi-Fi communication link and/or a cellular communication link) and a wired communication link (e.g., backhaul communication for a wireless communication network, wired connections that implement a backbone of the Internet, and the like). In some implementations, the client device and the edge device communicate over a packet switched network that implements Internet Protocol ("IP"). A cloud device can be any device that is remote from the client device (e.g., off-premises) whose communications with the client device generally have a latency that is above the latency criteria, such as between 100 and 150 ms.

A personal edge device can be owned and/or managed by the user. For example, the client device may be a smart display or a wearable device while the personal edge device can be a laptop or desktop or other compute unit. The personal edge device can connect with the client device primarily over a wireless network (e.g., Wi-Fi), via a wireless link (e.g., Bluetooth), or over a network that does not include mixed communication links. In some situations, the personal edge device can be non-stationary.

In some implementations, a gateway device can be a type of a network edge device that performs multiple functions. For example, a gateway device can connect the client system to a data network, such as a packet data network. The gateway device can serve as a transition point between a first sub-network and a second sub-network that communicate using different communication protocols (e.g., transition point for wireless network protocol, such as Long Term Evolution ("LTE") or Wi-Fi, and packet data network protocol, such as Internet Protocol "IP"). In an example where a client system connects to an LTE wireless network, the gateway device can represent a packet data network ("PDN") gateway ("PGW") and/or the serving gateway ("SGW").

In some implementations, the gateway device can connect the client system to an internal network of a service provider (e.g., software service provider). For example, incoming traffic to the internal network (e.g., traffic from the public Internet) can be received at one or more gateway device(s) and routed to one or more additional network components (e.g., servers, load balancers, virtual machines, network connected storage, and the like). For example, the incoming traffic can include a client system request that is received at the gateway device and routed to a network component that services the request. A response to the client system request can be returned to the gateway device such that the gateway device can transmit the response to the client system (e.g., over the public Internet). In some implementations, a given gateway device can represent the access point for a given client into the internal network. For example, one or more logical connections can be established that are associated with the client system within the internal network, where the logical connection has an endpoint at the gateway device. In some implementations, the internal network can be a private network associated with an organization, entity, data service (or set of data services), and/or any other suitable type of private network.

Implementations load a gateway device with edge computing resources (e.g., effects engine and workload resources) to configure the gateway device to perform workloads on visual frames offloaded from a client system. In this example, the client system can offload visual frames to the gateway device, the gateway device can perform data services at the offloaded visual frames (e.g., using the computing resources), and the gateway device can return the processed frames to the client system. In these implementations, the gateway device performs both gateway functionality for the client system and offloaded visual frame processing for the client system.

In some implementations, the gateway device can be part of a radio device (e.g., eNodeB, small cell, or other suitable access node) that implements a wireless network. For example, the radio device can include one or more antennas for sending wireless transmissions to a client system and receiving wireless transmissions from the client system. Implementations of the radio device receive data transmissions from the client system as a series of wireless data frames. The wireless data frames can be processed to access a payload from the wireless data frames. In some implementations, the payloads from wireless data frames can be used to reconstruct offloaded visual frames (e.g., camera frames) at the radio device. The reconstructed offloaded visual frames can be processed at the radio device (e.g., by resources loaded and initialized at the gateway device that is part of the radio device). The processed visual frames can be returned to the client system by the radio device (e.g., transmitted as a series of wireless data frames to the client system). In some implementations, the client system can be configured to reconstruct the processed visual frames and stream the processed visual frames as a streaming video.

Implementations support real-time functionality. In an example where visual frames are received at a client device, offloaded to a gateway device/edge device for processing, returned to the client device after being processed, and displayed at the client device, the receiving of the visual frames (e.g., capturing of camera frames) and the displaying of the visual frames (after offloading and processing) can occur in real-time. These functions occur in "real-time" (as used herein) when they occur within a threshold amount of time from one another, such as less than 20 ms.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Conventional software systems can perform data services on visual frames at a client device. However, these software systems often include stringent hardware requirements and consume large quantities of client device computing resources and battery power. Some existing systems offload data services from a client device to a data center, however these systems fail to provide a sufficiently low latency for the communication that supports real-time display of offloaded visual frames, lack a dynamic functionality for performing multiple client systems services at a single gateway device, and generally lack a coordinated set of computing devices (i.e., edge devices) configured to provide a managed set of data services to mobile client systems.

Implementations disclosed herein achieve a configuration between a client device and a gateway device/edge device that supports real-time communication for offloading visual frames (from the client device to the gateway device/edge device) and receiving, in return, processed visual frames for display. For example, resource distribution and management, connection techniques, and mobility based data service handovers can be implemented to load gateway devices and edge devices with resources that configure the devices to perform data services and to connect client devices that request data services to gateway devices/edge devices with a matching capability. The combination of functionality achieved by some implementations supports a real-time user experience at the client device. For example, visual frames (e.g., camera frames) can be captured at the client device, offloaded to a gateway device/edge device where a data service workload is performed, returned to the client device, and displayed as streaming video, where the capturing of the visual frames and the display of the streaming video occurs in real-time.

In some situations, a client device may include a limited processing power, limited battery power, or may otherwise be in a state that renders the client device ineffective at performing certain data services. In such a scenario, conventional or existing systems are generally unable to perform data services for visual frames captured at the client device in a manner that achieves a real-time display of the visual frames. Implementations disclosed herein, to the contrary, support data services for visual frames received at client devices that lack the hardware capabilities and/or available resource capacity to perform the data services. These implementations can perform management and coordination of gateway devices/edge devices and offloading of the visual frames to a device that is able to meet a service criteria, such as a compute criteria for performing the data services and a latency criteria that achieves the real-time display of the visual frames when they are returned to the client device.

Several implementations are discussed below in more detail in reference to the figures. FIG. 1 is a block diagram illustrating an overview of devices on which some implementations of the disclosed technology can operate. The devices can comprise hardware components of a computing system 100 that offload visual frames to a gateway device for processing. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, edge network manager 164, and other application programs 166. Memory 150 can also include data memory 170 that can include, e.g., e.g., software components (e.g., workload resources), usage data, edge/gateway registry data, client, edge, and/or cloud metric data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
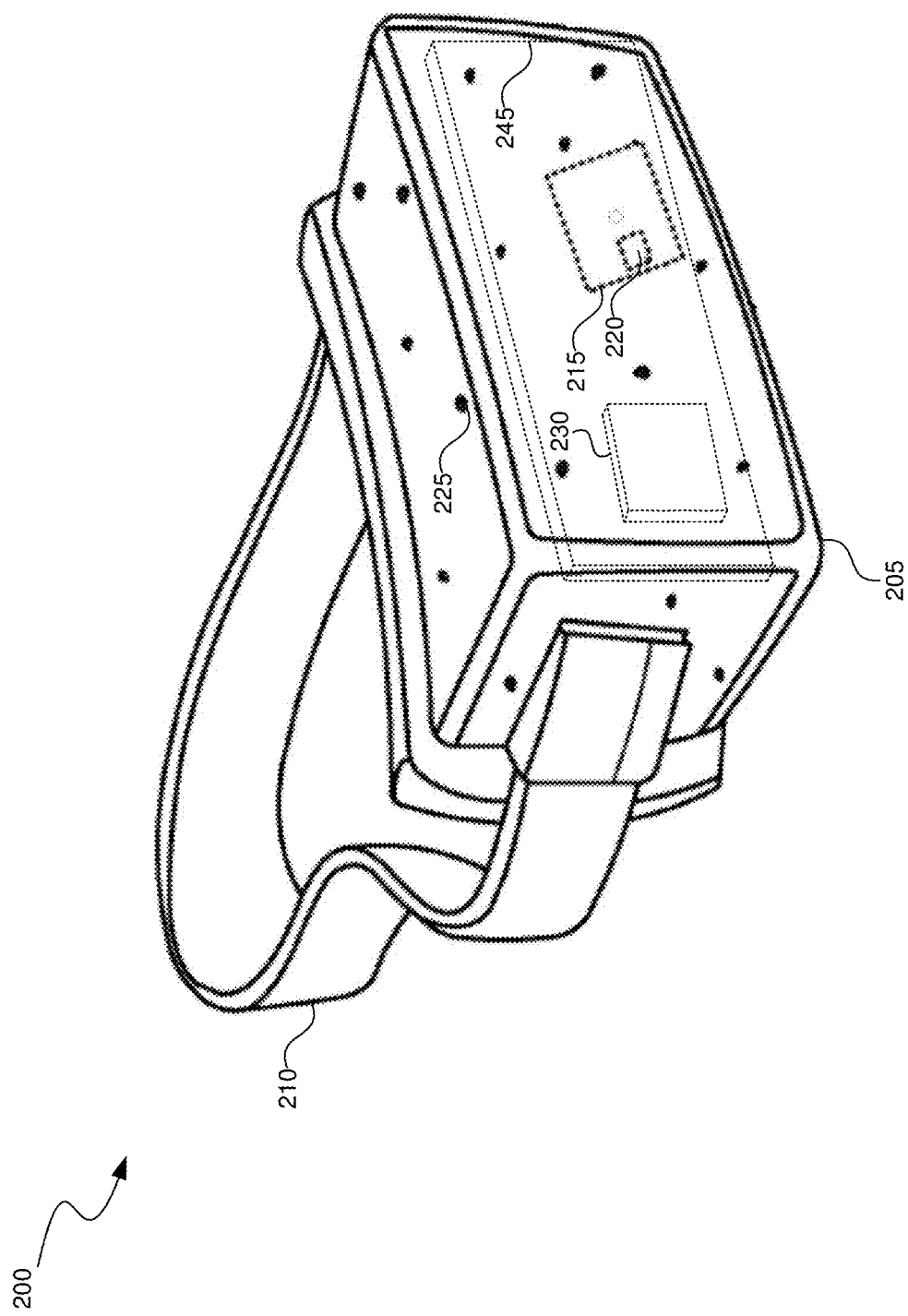
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
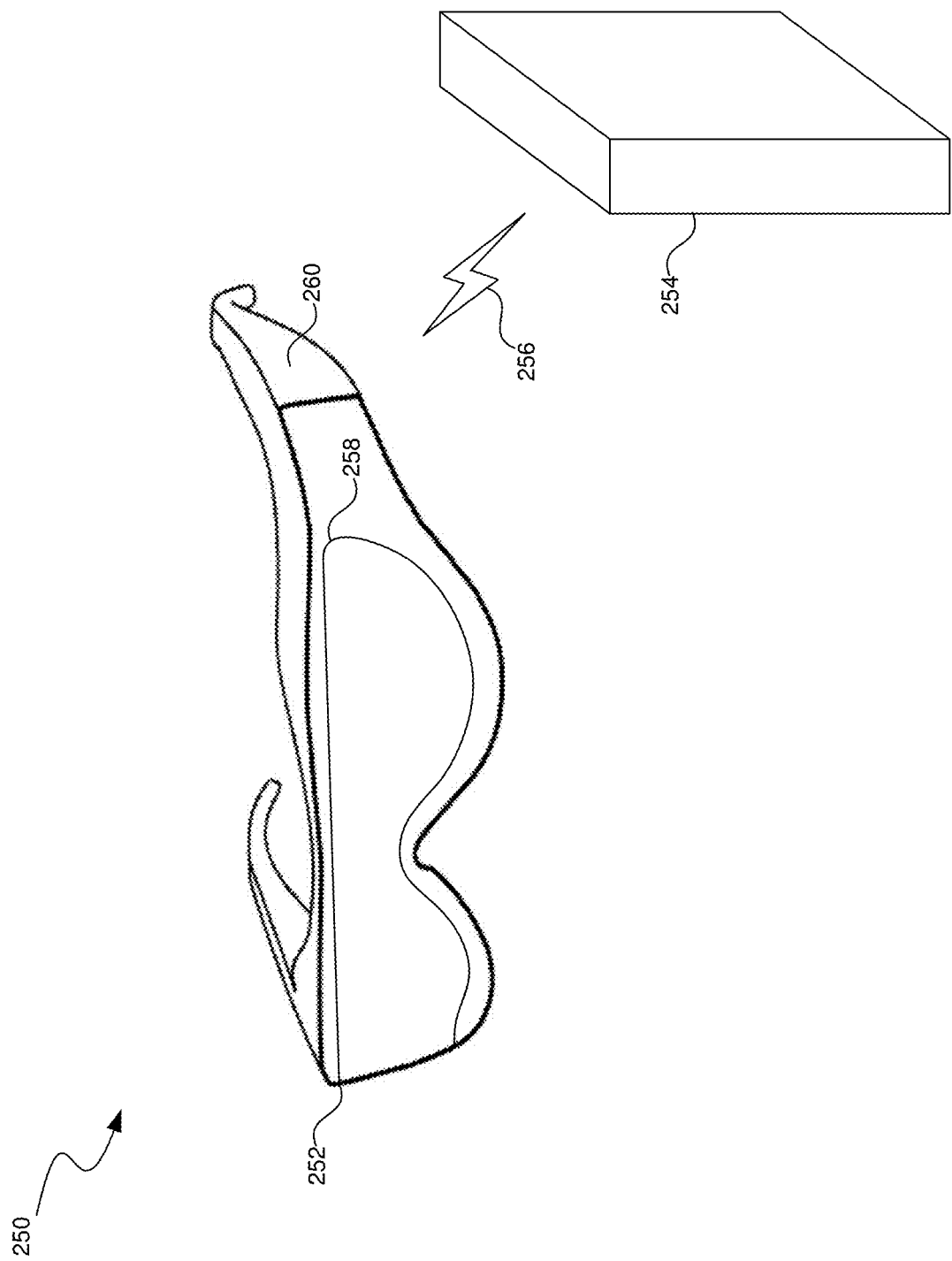
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
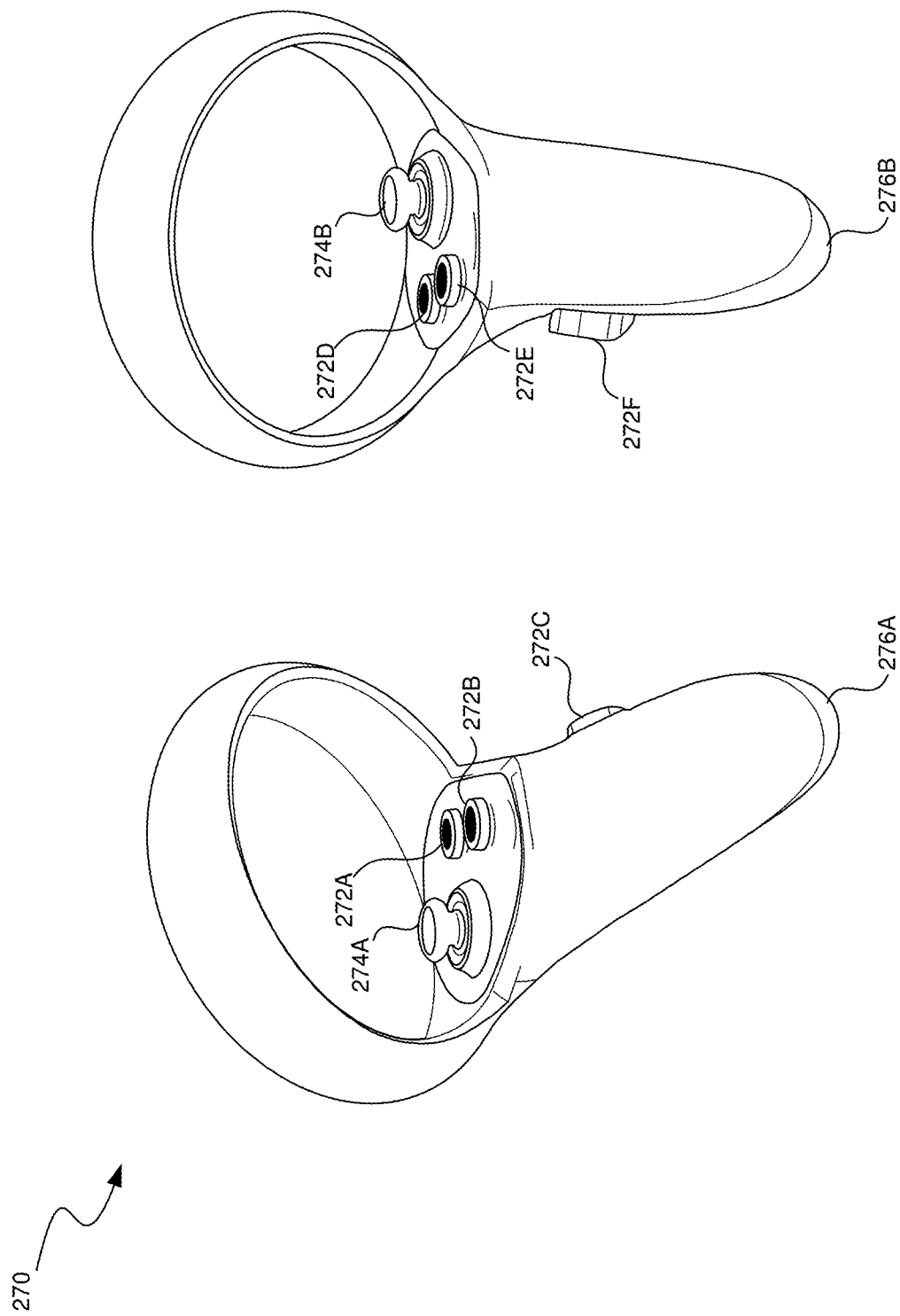
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
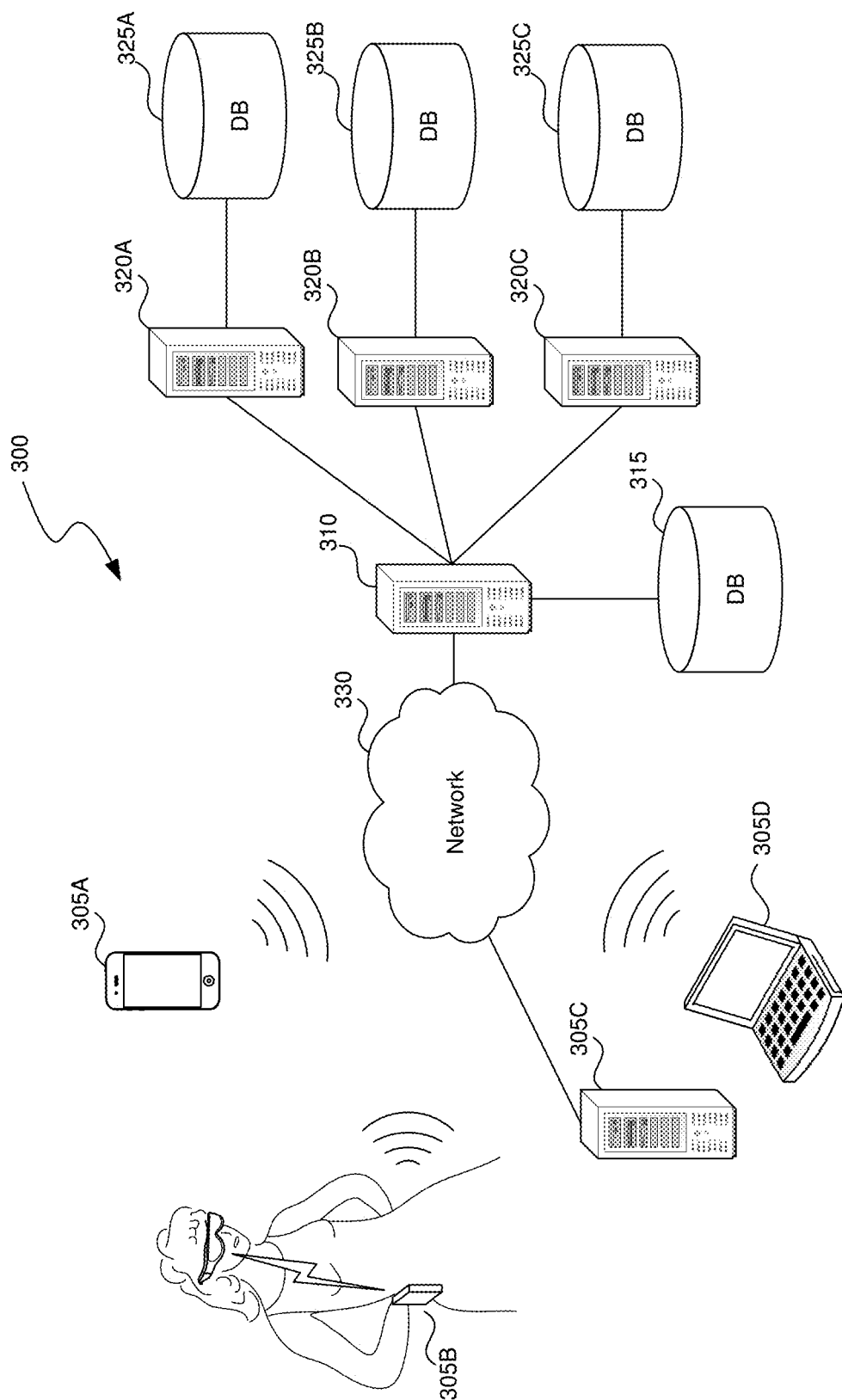
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
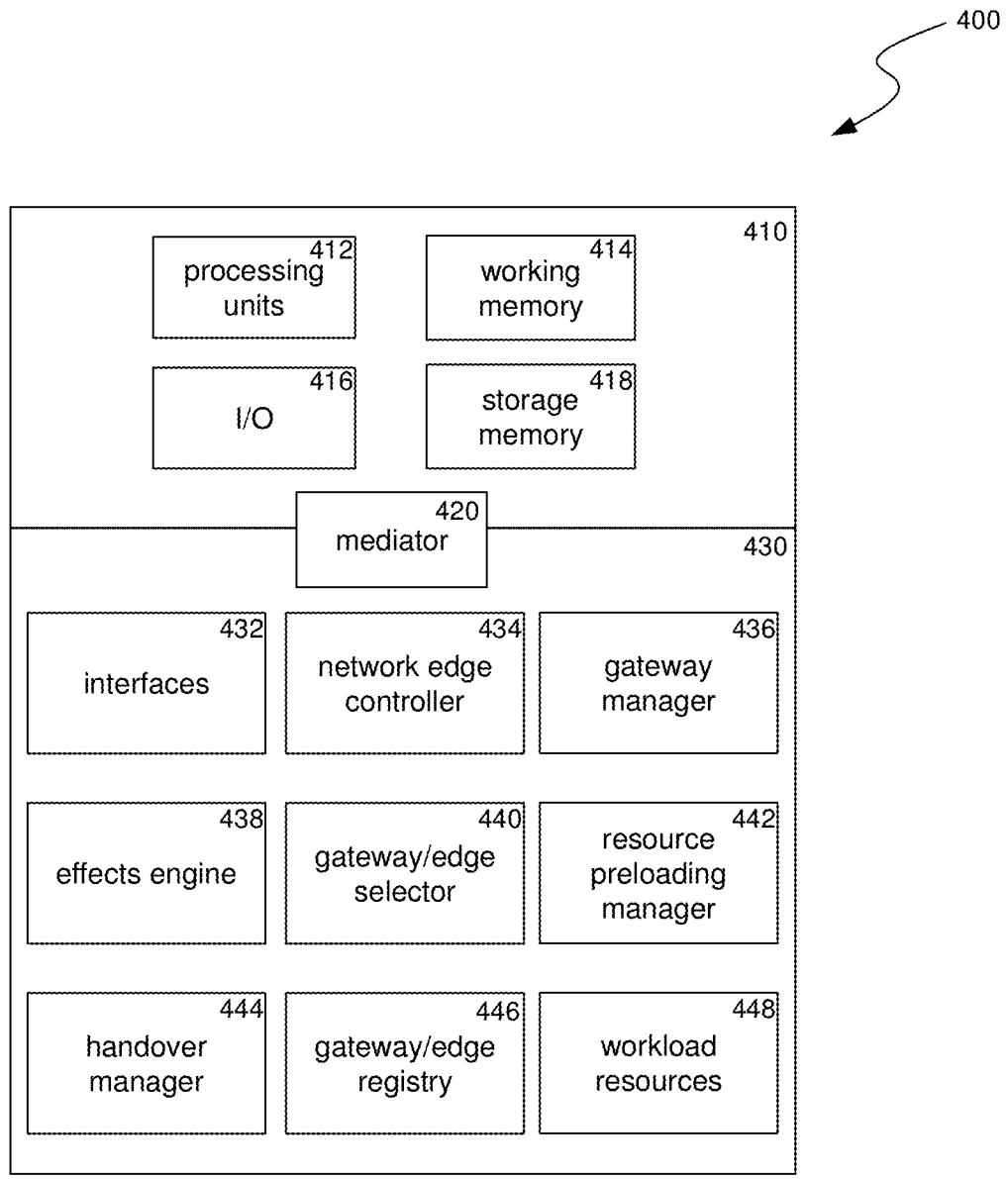
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for selectively offloading visual frames to an edge device for processing. Specialized components 430 can include network edge controller 434, gateway manager 436, effects engine 438, gateway/edge selector 440, resource preloading manager 442, handover manager 444, gateway/edge registry 446, workload resources 448, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Network edge controller 434 manages the deployment and operation of edge devices and gateway devices that process offloaded visual frames. Implementations of edge controller 434 can run at client systems, edge devices, gateway devices, and/or cloud systems. For example, a network edge controller 434 running in a cloud system can initialize data services (e.g., transmit software and resources) at edge devices and/or gateway devices (e.g., devices with computing hardware) such that the devices are configured to perform data services on offloaded visual frames. For example, network edge controller 434 can deploy, to an edge device or gateway device, software that configures the device to perform one or more of the data services (e.g., effects engine 438 and/or any other suitable software). Example data services can include object tracking for objects in the visual frames, generating overlays, masks, images, or three-dimensional volumes for augmenting the visual frames, artificial reality video processing for the processed visual frames, three-dimensional mapped environment video processing for the processed visual frames, generative adversarial network ("GAN") processing, and any other suitable data service for processing offloaded visual frames.

Implementations of network edge controller 434, running in a cloud system, can track data services associated with a given edge device or gateway device. For example, network edge controller 434 can track the usage of data services rendered for client systems connected to a gateway device. Client systems may store usage information (e.g., logs with timing information, frequency information, and other suitable usage information) of the data services rendered for the client system, and the usage information can be accessed to track the data services performed for the client systems. In some implementations, the tracked data services can relate to one or more applications (e.g., applications running on the client systems). Similarly, implementations of network edge controller 434 can track the usage of data services rendered for client systems that are proximate to the one or more edge device locations.

Using the tracking and any other suitable criteria, network edge controller 434 can select data services for deployment to a given gateway device and/or edge device. The data services selected for deployment can include data services historically requested by client systems connected to a gateway device, proximate to an edge device, or any other suitable set of data services. Resource preloading manager 442 can access the selection of data services and preload workload resources 448 corresponding to the selected services to gateway devices or edge devices.

Implementations of network edge controller 434 can also run at a client system. For example, at a client system network edge controller 434 can be used to establish a communication session with a gateway device or edge device, such as a real-time communication session (e.g., webRTC session, wireless communication protocol session, or other suitable real-time communication sessions). The established communication session can be used to offload visual frames (received at the client system) to the gateway device/edge device and receive back processed frames from the device at the client system, where the client system can then display the processed frames (e.g., to a user as streaming video). The gateway device/edge device may perform data services on the visual frames prior to transmitting them back to the client system. The real-time communication session can support a latency for the round trip of the offloaded visual frames such that the receiving of the visual frames at the client system (e.g., capturing of the frames with a camera) and the displaying of the processed frames (offloaded to and returned by the gateway device or edge device) occurs in real-time. Network edge controller 434 can also terminate a communication session with a gateway device/edge device, such as when the data service provided by the device has not been requested for a threshold amount of time, after a handover of data services, or in response to a selection (e.g., user selection or selection by a software application) to no longer use the data service.

Network edge controller 434 can also discover edge devices proximate in location to one or more user systems/devices. Implementations of network edge controller 434 running at a cloud system can track the locations of edge devices, the functionality loaded onto the edge devices (e.g., workload resources), computing ability or current available resources of the edge devices, the network addresses for edge devices, latency to access edge devices by various clients, and any other suitable information. For example, the edge device information tracked and stored by network edge controller 434 can be stored at gateway/edge registry 446. Gateway/edge registry 450 can be periodically updated to update locations, functionality, and network addresses for edge devices.

Gateway manager 436 can manage gateway devices such that the gateways are configured to perform gateway functions for client systems and perform data services on offloaded visual frames for client systems. Implementations of gateway manager 436, running at a cloud system, can track the locations of gateway devices, the functionality loaded onto the gateway devices (e.g., workload resources), computing ability or current available resources of the gateway devices, the network addresses for gateway devices, and any other suitable information. For example, the gateway device information tracked and stored by gateway manager 436 can be stored at gateway/edge registry 446. Gateway/edge registry 450 can be periodically updated to update locations, functionality, and network addresses for the gateway devices.

In some implementations, gateway manager 436 can monitor a load on a gateway device, compare the load to a criteria, and provision a new gateway based on the comparison. For example, if a monitored load (e.g., utilization metric, number of client connections, and the like) for a gateway device meets a criteria (e.g., utilization criteria, number of connections criteria, and the like), gateway manager 436 can provision a new gateway and select a subset of client systems to transition from the existing gateway to the new gateway. Handover manager 444 can configure the handover of in-progress data services for transitioning client systems from the existing gateway device (or another servicing edge device) to the new gateway.

Effects engine 438 can be software that processes visual frames. For example, effects engine 438 can, when configured with one or more workload resources 448, track objects/segments in the visual frames, generate overlays, masks, images, or three-dimensional volumes for augmenting the visual frames, perform artificial reality video processing for the visual frames, perform three-dimensional mapped environment video processing for the visual frames, perform generative adversarial network ("GAN") processing on the visual frames, and/or perform any other suitable processing on visual frames. An implementation of effects engine 438 can include components of Spark AR engine, Spark AR Studio, or any other suitable effects engine.

Gateway/edge selector 440 can select a gateway device or edge device for a data service. For example, gateway/edge selector 440 can be implemented at a cloud system. In response to a request for one or more data services from a client system (e.g., application running on the client system) gateway/edge selector 440 can select a device for the requested data service.

In some implementations, gateway/edge selector 440 selects a device for the data service by locating a gateway device that has a connection with the requesting client system. For example, a gateway device may connect the client system to a wireless network, internal data network, public data network, or any other suitable data network. In some implementations, the located gateway device is an endpoint for a logical connection associated with the client system. Gateway manger 436 can be queried to locate the gateway device.

Gateway/edge selector 440 can compare metric(s) for the located gateway device to service criteria for the requested data service. For example, requested data service can include one or more criteria for performing the data service. Example criteria can include a resource criteria for performing the data service (e.g., one of workload resources 448), a latency criteria (e.g., 10 milliseconds, 20 milliseconds, 30 milliseconds, and the like), a processing power criteria (e.g., threshold device processing power), and other suitable criteria. In some implementations, the criteria for the requested data service can be compared to the metrics for the located gateway device to determine whether the gateway device can perform the requested data service.

Example metrics for the gateway device include a processing power metric for the device (e.g., combination of speed, number of cores, cache memory, graphical card—GPU—or other video processing hardware, and other suitable parameters that reflect the processing power of a device), a device capacity metric (e.g., processor utilization, memory utilization, and the like), device preloaded resources (e.g., workload resources 448), and other suitable metrics. An example comparison can be comparing the gateway device computing power metric and/or gateway device preloaded resources to the processing power criteria and resource criteria of the requested data service. When the gateway device metrics meet the data service criteria the gateway device can be selected for the requested data service, and when the gateway device metrics fail to meet the data service criteria another device (e.g., edge device) can be selected for the data service.

For example, when the gateway device metrics fail to meet the data service criteria, gateway/edge selector 440 can compare metrics for one or more edge devices to the data service criteria. Example metrics for the edge devices include a processing power metric for the device, a device capacity metric, device preloaded resources, and other suitable metrics. When at least one edge device meets the service criteria for the requested data service, gateway/edge selector 440 can select the edge device for the requested data service.

Resource preloading manager 442 can preload workload resources 448 at gateway devices and edge devices according to instructions from edge controller 434. For example, edge controller 434 can select data services for edge devices and gateway devices, and resource preloading manager 442 can preload workload resources 452 that correspond to the selected data services at these devices. In some implementations, resource preloading manager 442 can preload resources at a gateway device or edge device based on an initialization of a handover of data services. For example, when a data service is to be handed over to a target gateway device or edge device, resource preloading manager 442 can preload the target device with a workload resource that corresponds to the data service being handed over. In another example, resource preloading manager 442 can preload a newly provisioned gateway with workload resources 448. For example, a set of client systems can be selected for transitioning to the new gateway, and workload resources 448 can be preloaded to the gateway in accordance with any in-progress data services and/or the usage history for data services for the set of client systems. In some implementations, preloading a gateway device or edge device with a resource includes transmitting instructions to the device to retrieve the resource from a network location (e.g., content delivery network, cache, and the like).

Handover manager 444 can configure user systems and gateway devices/edge devices to perform a handover of in-progress data services. For example, a first gateway device or edge device can provide in-progress data services to a client system. Handover manager 444, running in a cloud system, can determine a location and a movement metric for the client system. For example, the movement metric can be determined by storing multiple client system locations over a period of time. The system locations over the period of time can represent a change in distance, for the client system, from various edge devices. The change in distance and period of time can be used to generate a rate of change, or speed. In addition, the stored locations can also be used to discern a directional component for the speed. Together, the direction and speed can be used to generate a velocity metric for the client system.

Handover manager 444 can generate a predicted location for the client system based on the movement metric. For example, the predicted location can be a location predicted for the client system at a future point in time (e.g., in 10 seconds, 15 second, 30 second, 1 minute, 2 minutes, and the like). A second gateway device or edge device can be selected for the client system according to the predicted location for the client system. For example, the selected device can be proximate to the predicted location (e.g., within a threshold distance), can be a gateway device that serves an access node (e.g., wireless network access node) proximate to the predicted location, or any other suitable device.

Workload resources 448 that correspond to the in-progress data service can be preloaded to the selected device. For example, resource preloading manager 442 can preload the corresponding workload resources 448 in anticipation of a handover. Handover manager 444 can then detect that the client system is located at (e.g., within a predefined range of) the predicted location at the future point in time. Network edge controller 434 can then initialize the resources preloaded at the selected device for the upcoming data service handover. After initialization, handover manager 444 can instruct the client system to perform a handover from the first gateway device/edge device to the second gateway device/edge device.

Network edge controller 434 running at the client can receive the instruction from handover manager 444 and initiate a handover flow. For example, network edge controller 434 at the client can establish a connection (e.g., real-time connection) with the second gateway device/edge device. Network edge controller 434 at the client can then offload a first portion of frames to the first gateway device/edge device and a second portion of frames to the second gateway device/edge device.

In some implementations, the first portion of frames and second portion of frames can include redundant frames. For example, when a service criteria for the in-progress data service meets a redundancy criteria (e.g., latency criteria, dropped visual frame criteria, resolution criteria, and the like) and/or the movement metric for the client system meets the redundancy criteria (e.g., speed threshold) the first portion of frames and second portion of frames can include redundant frames. Transmission of redundant frames can mitigate against dropped frames and maintain service levels for the in-progress data service.

The client system can receive the processed frames from the first gateway device/edge device and the second gateway device/edge device. Any redundant processed frames can be discarded. The processed frames can be displayed at the client system as streaming video (e.g., with an augment generated by performance of the on-going data service). Network edge controller 434 can terminate the real-time connection with the first gateway device/edge device once a termination criteria is met by the communication with the second device. For example, once a latency for the communication with the second device meets a criteria (e.g., is below a threshold, is less than a latency for the first device, and the like), network edge controller 434 at the client system can terminate the real-time communication session with the first device.

Workload resources 448 can be resources that configure software (e.g., effects engine 438) to process visual frames. In an example, workload resources 448 can be a trained machine learning model configured to perform a workload on a visual frame, various 2D or 3D models, audio content, kinematic models, mapping or location data (e.g., SLAM data), etc. An example workload resource 448 can be a trained GAN configured to process visual frames and generate a visual augment. Other workload resources 448 can be trained and/or configured to: track objects in the visual frames, generate overlays, masks, images, or three-dimensional volumes for augmenting the visual frames, perform artificial reality video processing for the visual frames, perform three-dimensional mapped environment video processing for the visual frames, and any other suitable data service for processing offloaded visual frames. Workload resources 448 can be any other suitable resource (e.g., model, software, etc.) for performing a workload on streaming visual frames. Workload resources 448 can be preloaded to gateway devices and/or edge devices such that a workload can be performed on visual frames by an engine (e.g., effects engine 438) using the preloaded resources.

A "machine learning model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of a service being used a given a location or set of users based on an analysis of previous user service selections. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

Workload resources 448 of FIG. 4 can be trained machine learning models. For example, a generative adversarial network can be trained to generate augments for visual frames. An example GAN can include two neural networks, a generator and a discriminator. In training, a GAN's generator is trained to fool the GAN's discriminator. A GAN can be trained using a variety of techniques, including unsupervised learning, semi-supervised learning, fully supervised learning, and/or reinforcement learning. Other workload resources 448 can be other types of machine learning models trained to track objects/segments in visual frames, and perform other suitable processing on visual frames. For example, workload resources 448 can include convolutional neural networks, deep convolutional neural networks, very deep convolutional neural networks, transformer networks, encoders and decoders, and other suitable machine learning components.

Some machine learning models can be trained with supervised learning. For example, a convolutional neural network can be trained to detect and track object in streaming video. The training data can include visual frames as input and a desired output, such as object boundary labels (e.g., bounding boxes). An instance of training data, such as a visual frame, can be provided to the model. Output from the model can be compared to the desired output for that visual frame and, based on the comparison, the model can be modified, such as by changing weights between nodes of the neural network or parameters of the functions used at each node in the neural network (e.g., applying a loss function). After applying the visual frames and labels in the training data and modifying the model in this manner, the model can be trained to track objects.

Figure 5:
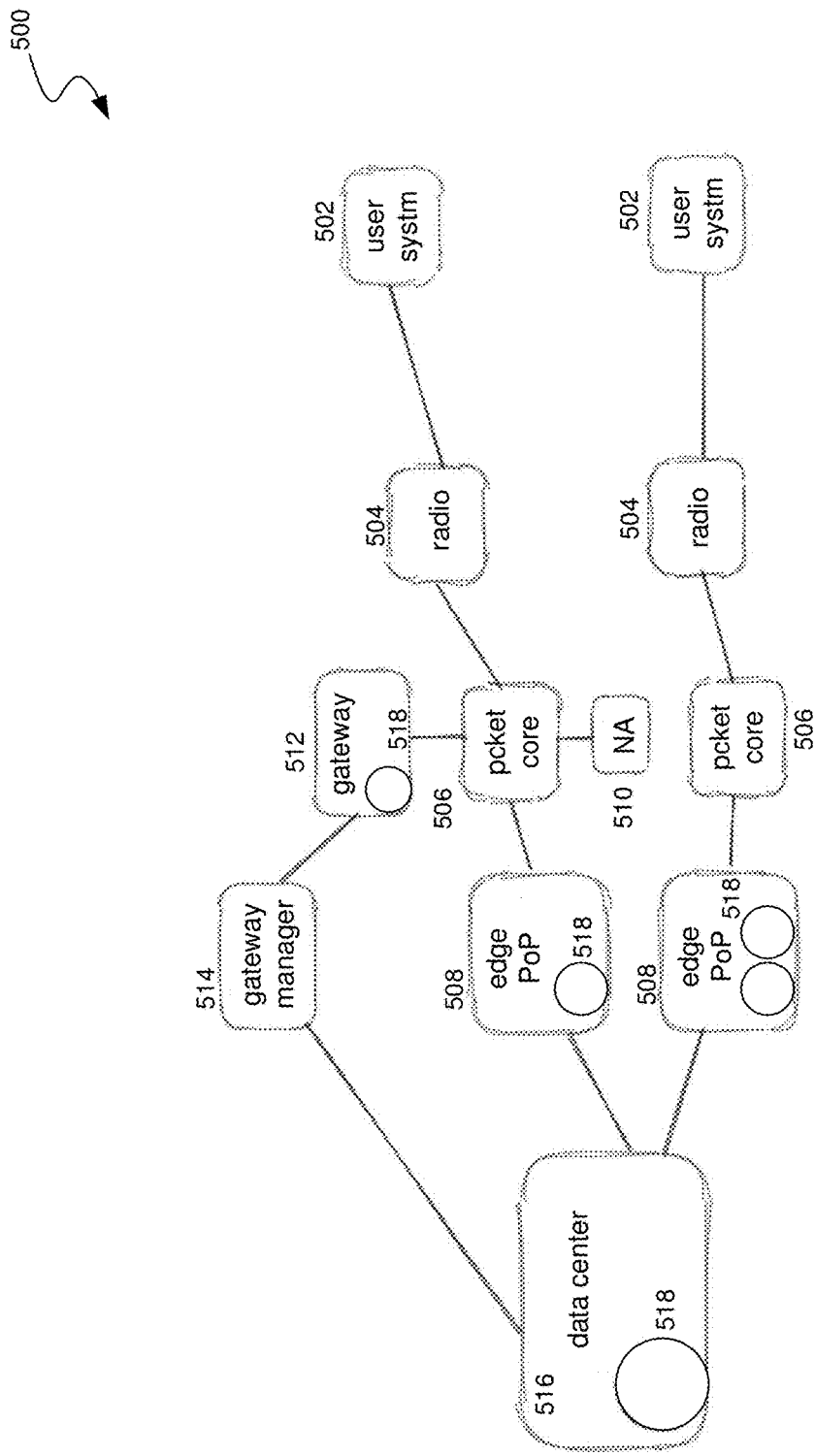
FIG. 5 is a system diagram illustrating components for offloading visual frames to a gateway device for processing.

FIG. 5 is a system diagrams illustrating components for offloading visual frames to a gateway device for processing. System 500 includes user systems 502, radio devices 504, packet cores 506, edge devices 508, network appliance 510, gateway device 512, gateway manager 514, data center 516, and engines 518. Gateway manager 514 can manage gateway 512 and configure the gateway to perform multiple functions, such as gateway functionality and edge data service functionality.

In some implementations, gateway manager 514 can be part of a cloud system that includes data center 516 or part of a separate cloud system. For example, gateway manager 514 can be incorporated into cloud systems, edge systems, and/or packet core systems for a mobile network operator ("MNO"). Gateway manager 514 can also be distributed across several devices that coordinate to manage several deployed gateway devices (e.g., maintain coordinated data about managed gateways). In some implementations, data center 516 can communicate with gateway manager 514 to deploy compute engine 518 at gateway device 512.

A request for a data service from user system 502 can be received at data center 516, edge device 508, or gateway 512. Based on the request, gateway manager 514 can be queried to locate a gateway for the requested user system. Once located, preloaded resources at the gateway 512 (or dynamically loaded resources) can be used to provide the requested data services to user system 502.

Radios 504 and packet cores 506 can implement a wireless communication network (e.g., LTE network). For example, radio 504 can be an eNodeB (or small cell) and packet cores 506 can include components of an Evolved Packet Core ("EPC"). Because gateway device 512 is located near the packet core for the wireless communication network, a latency for communication between gateway device 512 and user systems 502 can be favorable such that the gateway device can support edge services for the user system. While gateway 512 is located at a network edge, some implementations include providing edge services from a radio edge device.

Figure 6:
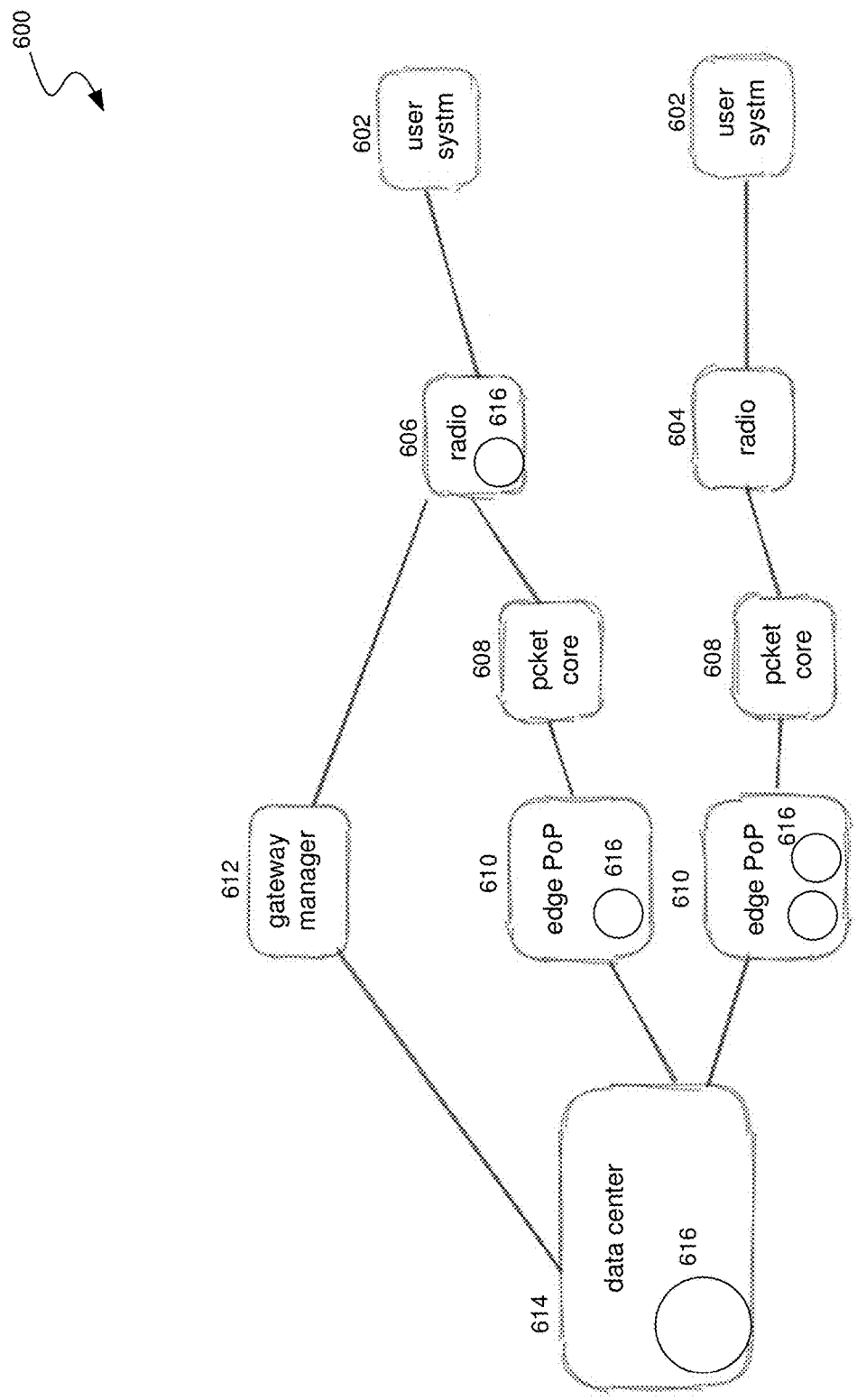
FIG. 6 is a system diagram illustrating components for offloading visual frames to a radio edge device for processing.

FIG. 6 is a system diagrams illustrating components for offloading visual frames to a radio edge device for processing. System 600 includes user systems 602, radio device 604, radio device 606, packet cores 608, edge devices 610, gateway manager 612, data center 614, and engine 616. The components of system 600 are similar to the components of system 500, however a compute engine 616 is deployed at radio device 606. Gateway manager 612 can manage radio 606 (e.g., a gateway device located at the radio) and configure the radio to perform multiple functions, such as radio functionality and edge data service functionality. For example, data center 614 can communicate with gateway manager 612 to deploy compute engine 616 to radio 606.

A request for a data service from user system 602 can be received at data center 614 or edge device 610. Based on the request, gateway manager 612 can be queried to locate a gateway for the requested user system, or radio 606. Once located, preloaded resources at the radio 606 (or dynamically loaded resources) can be used to provide the requested data services for user system 602.

Similar to FIG. 5, radio 604, radio 606, and packet cores 608 can implement a wireless communication network (e.g., LTE network). Because radio 604 includes a gateway device and computing engine 606, and radio 604 is located near the radio edge for the wireless communication network, a latency for communication between gateway device 512 and user systems 502 can be highly favorable such that the radio device (with the deployed compute engine 616) can support edge services for the user system.

Figure 7:
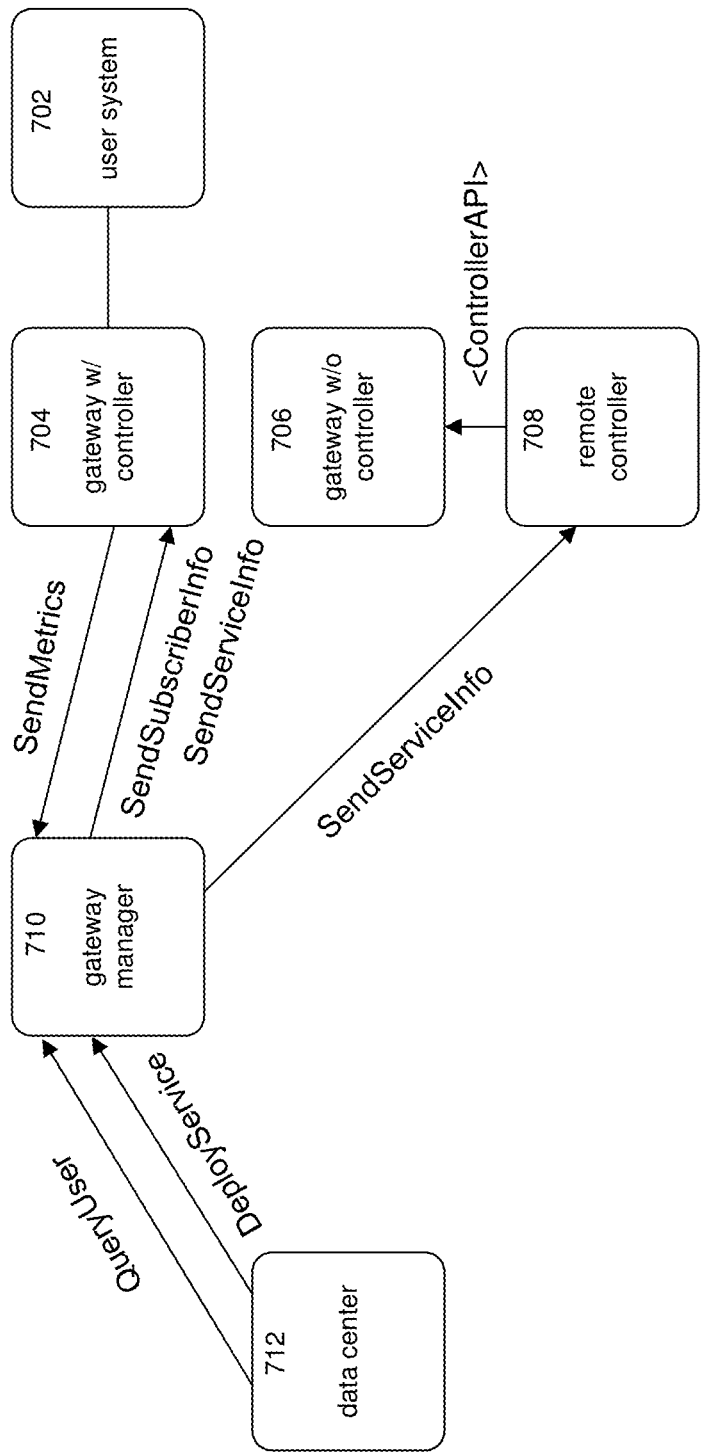
FIG. 7 is a diagram illustrating communication among components for configuring a gateway device to process offloaded visual frames.

FIG. 7 is a diagram illustrating communication among components for configuring a gateway device to process offloaded visual frames. System 700 includes user systems 702, gateway with controller 704, gateway without controller 706, remote controller 708, gateway manager 710, and data center 712. The components of system 700 can communicate using an application programming interface ("API"). An example API structure is below:

QueryUser(User) returns (Gateway): Queries for the presence of a client system and returns the gateway that is serving the client system.

QueryGateway(ListOpts) returns (ListGateway): Queries gateways for a certain set of options and returns a list of gateways that match the list of options. The list can include features such as platform, utilization metrics, preloaded workload resources, computing power metric, and other suitable parameters used for selecting a device to perform a data service.

DeployService(Gateway, ServiceDefinition): Deploys a service defined in the ServiceDefinition on the gateway passed to the API. This can include preloading a workload resource, software engine (e.g., effects engine) or any other suitable resource. The API returns true on a successful deploy and false on a failure.

SendServiceInfo(ServiceDefinition): Streams service configuration info to a local or a remote controller for a gateway to start a service.

Initially, data center 712 queries gateway manager 710 to retrieve the gateway for a given client system using QueryGateway. Data center 712 then issues a DeployService API call to deploy a data service at the located gateway. Gateway manager 710 communicates with gateway with controller 704 using SendServiceInfo to configure initialization of the data service. Gateway with controller 704 also sends information about the gateway (e.g., metrics) to gateway manager 710. Similarly, gateway manager 710 can communicate with remote controller 708 using SendServiceInfo to configure initialization of the data service at gateway without controller 706.

Figure 8:
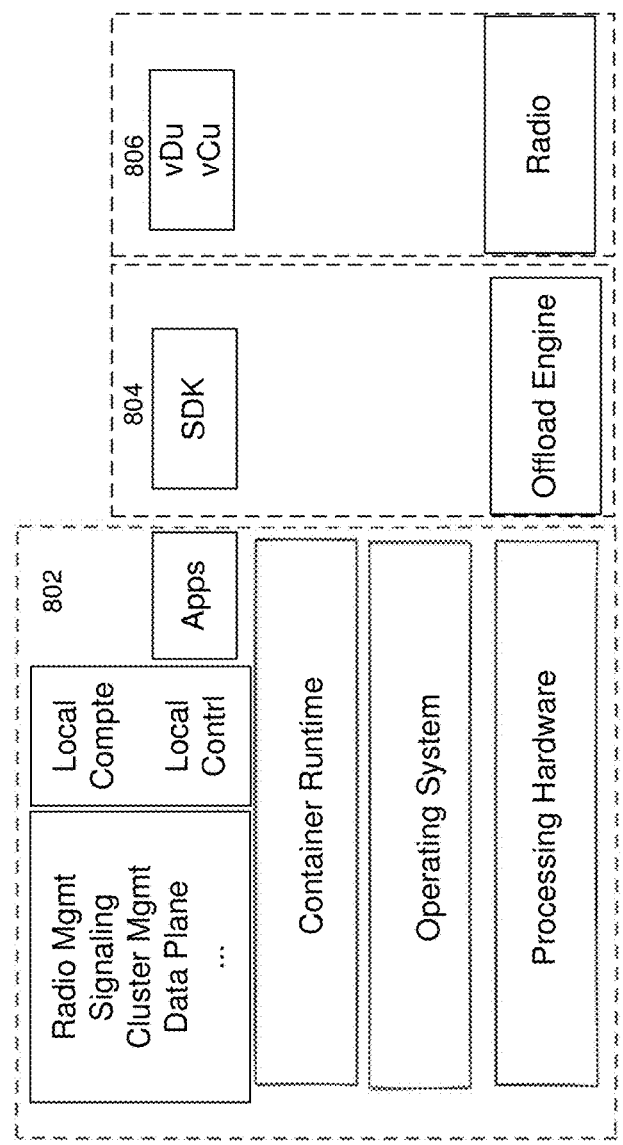
FIG. 8 is a system diagram illustrating components of a gateway device.

FIG. 8 is a system diagram illustrating components of a gateway device. System 800 includes gateway components 802, edge service components 804, and radio components 806. For example, gateway components 802 can include gateway hardware (e.g., x86 or ARM compute engine), an operating system (e.g., Ubuntu, Fedora CoreOS, or any other suitable general purpose or limited operating system), container runtime (e.g., docker), and software components for performing gateway functions. For example, gateway components can comprise a Magma Access Gateway that performs functions such as SCTP service (e.g., termination service for the SCTP connections for 51-C and N2 interfaces), MME service (e.g., implements S1AP, NAS and MME subcomponents for LTE control plane, and SGW and PGW control plane), eNodeB service, Magma service (e.g., parent service to Magma services, owns the collection and reporting of metrics of services, and acts as the bootstrapping client with Magma Orchestrator), DNSd service (e.g., Local DNS and DHCP server for the eNodeB), and other suitable Magma Access Gateway services. In some implementations, the gateway manager is a Magma Orchestrator for managing Magma Access Gateways.

Edge service components 804 include offload engines and offload software development kits (e.g., SDKs), such as an effects engine. Edge service components 804 can provide software and/or hardware for performing data services on offloaded visual frames. Radio components 806 can include radio hardware (e.g., antenna, etc.) and virtual distributed unit/virtual centralized unit for performing radio services within a wireless communication protocol (e.g., LTE). Gateway components 802, edge service components 804, and/or radio components 806 can be used to perform the multifunctional capabilities of a gateway device, such as gateway functionality, edge data service functionality, and radio functionality.

Those skilled in the art will appreciate that the components illustrated in FIGS. 1-8 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 9:
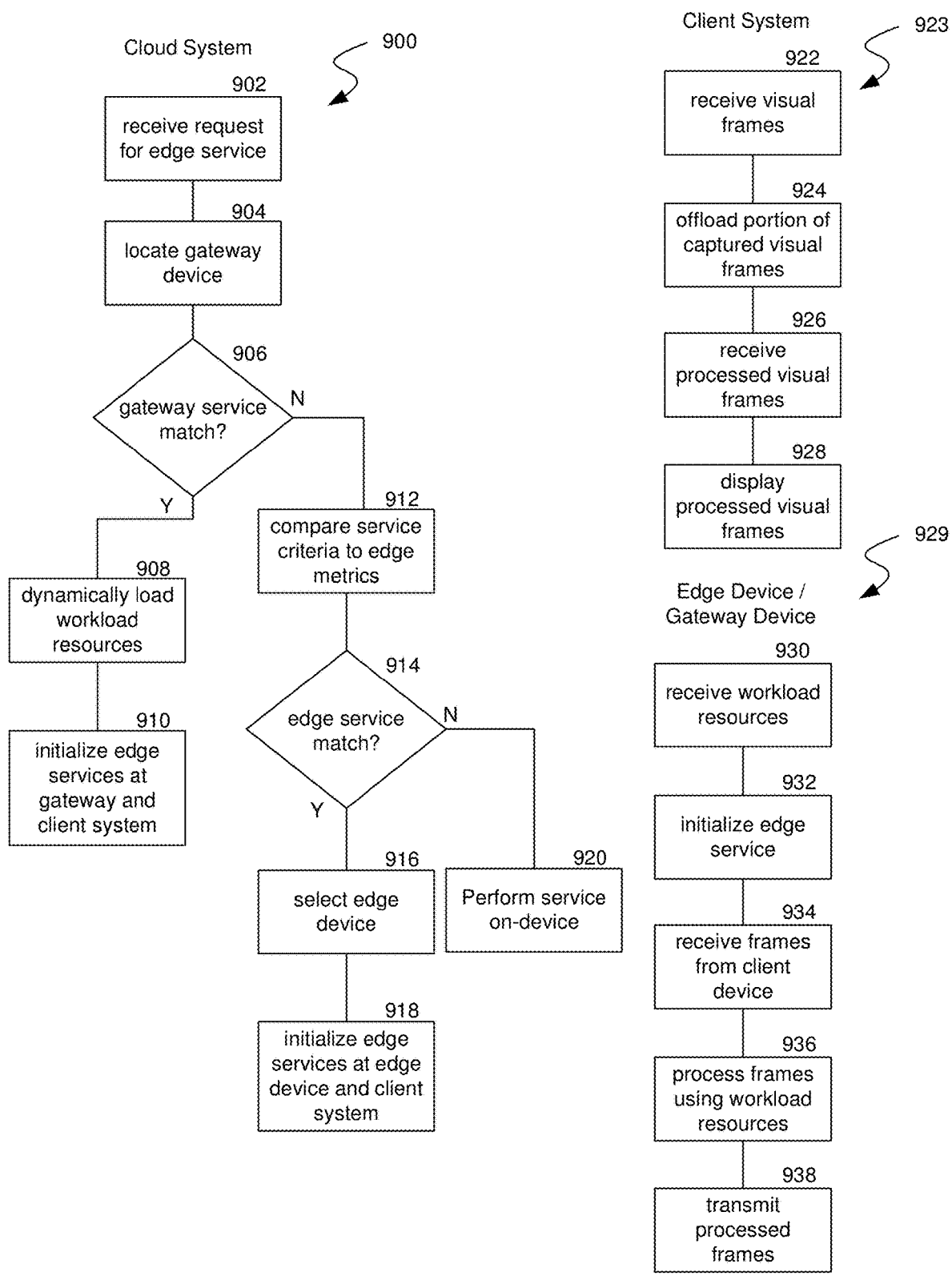
FIG. 9 illustrates a set of flow diagrams for processes used in some implementations of the present technology for offloading visual frames to a gateway device for processing.

FIG. 9 illustrates a set of flow diagrams for processes 900, 923, and 929 used in some implementations of the present technology for offloading visual frames to a gateway device for processing. In some implementations, processes 900, 923, and 929 can be performed based on the selection of a data service that corresponds to a workload for streaming visual frames. In some implementations, processes 900, 923, and 929 can be performed in real-time such that streaming visual frames can be received, offloaded, processed, returned, and displayed.

Processes 900, 923, and 929 include flow 900 for a cloud system, flow 923 for a client system, and flow 929 for an edge device/gateway device. The process 900 for the cloud system includes blocks 902-920, the process 923 for the client system includes blocks 922-928, and the process 929 for the edge device/gateway device includes blocks 930-938.

At block 902, process 900 can receive a request for data services. For example, the data service request can be from (or on behalf of) a client system for performance of a workload on offloaded visual frames. The requested data service can be object/segment tracking for objects in the visual frames; generative adversarial network ("GAN") processing; augmenting the visual frames with masks, overlays, images, three-dimensional volumes, etc.; artificial reality video processing for the visual frames; three-dimensional mapped environment video processing for the visual frames; or other suitable processing.

In some implementations, the request can be received at a cloud system, which can be part of a dedicated gateway manager (in one location or distributed and synchronized across several locations), one or more edge systems, a data center, or any other suitable component. The data service request (on behalf of the client system) can be received from the client system, a gateway device, an edge device, a gateway manager, or any other suitable component.

At block 904, process 900 can locate a gateway device for the client system. For example, a gateway device for the client system that will be delivered the data services can be located. The gateway device can connect the client device to a wireless network, internal packet data network, public packet data network (e.g., the Internet) or any other suitable network. In some implementations, the gateway device can be an endpoint for a logical connection associated with the client system.

At block 906, process 900 can compare metric(s) for the located gateway device to service criteria for the requested service. Example service criteria for the requested data service can include a resource criteria for performing the data service (e.g., one or more of workload resources), a latency criteria (e.g., 15 milliseconds, 20 milliseconds, 30 milliseconds, 40 milliseconds, and the like), a processing power criteria (e.g., threshold on-device processing power), and other suitable criteria.

In some implementations, a listing of workload resources at the gateway device can be compared to the service criteria to determine whether the gateway device is preloaded with a resource that corresponds to the requested data service. In an example, when the listing of workload resources does not meet the service criteria, another device can be selected for the requested data service (e.g., an edge device other than the located gateway device). In another example, when the listing of workload resources does not meet the service criteria, the gateway device can be dynamically loaded with the corresponding workload resource, and the metric for the gateway device can be determined to meet the service criteria in anticipation of the loading of the workload resource.

Some implementations can compare a processing metric for the gateway device to the service criteria for the requested data service (e.g., processing power criteria). Example processing metrics include a processing power metric for the gateway device (e.g., combination of speed, number of cores, cache memory, and other suitable parameters that reflect the processing power of a computing device), capacity metric for the gateway device (e.g., processor utilization, memory utilization, and the like), latency parameter, and other suitable metrics.

In some implementations, when the listing of workload resources at the gateway meets the service criteria for the requested data service and/or the processing metric for the gateway device meets the service criteria, an additional comparison can be performed that compares the processing power criteria of the requested data service to a utilization metric for the gateway device (e.g., processor utilization, memory utilization, and the like). For example, the processing power criteria can indicate a quantity of resources for performing the requested data service, and a gateway device may not have these resources available when under certain utilization conditions (e.g., high load). In this example, the processing power criteria can be translated to a predicted gateway device utilization, and when the utilization metric fails to meet the predicted gateway device utilization, the gateway device metric(s) may fail to meet the service criteria for the requested data service When the metric(s) for the located gateway device meet the service criteria for the requested service, process 900 can proceed to block 908. When the metric(s) for the located gateway device fail to meet the service criteria for the requested service, process 900 can proceed to block 912.

At block 908, process 900 can dynamically load workload resources at the gateway device. For example, a workload resource corresponding to the requested data service (e.g., capable of performing a workload that corresponds to the requested data service) can be dynamically loaded to the gateway device. In some implementations, when it is determined that the gateway device is preloaded with a workload resource that corresponds to the requested data service, a workload resource may not be dynamically loaded to the gateway device.

At block 910, process 900 can initialize resources loaded at the gateway device and initialize the client system for offloading visual frames. For example, loaded workload resources and a software engine (e.g., effects engine) can be initialized such that the resources are configured to receive and process offloaded visual frames. The client system can be transmitted the network location, identifier, and/or other information for establishing a real-time communication session with the gateway device.

At block 912, process 900 can compare metrics for edge devices to the service criteria for the requested service. For example, when the metrics for the located gateway device do not meet the service criteria for the requested data service, metrics for edge devices proximate to the client system can be compared to the service criteria.

For example, the edge devices proximate to the client system can be devices within a predetermined distance from the client system and/or edge devices capable of meeting a latency criteria when communicating with the wireless system. A location of the client system can be compared to locations of edge devices stored in a gateway/edge registry to determine one or more edge devices proximate to the client system. A listing of workload resources at the edge devices can be compared to the service criteria for the requested data service, one or more processing metrics for the edge devices can be compared to the service criteria, and/or one or more utilization metrics for the edge devices can be compared to the service criteria.

At block 914, when the metric(s) for at least one edge device meet the service criteria for the requested service, process 900 can proceed to block 916. When the metric(s) for at least one edge device fail to meet the service criteria for the requested service, process 900 can proceed to block 920.

At block 916, process 900 can select an edge device for the requested data service. For example, when metrics for at least one edge device meet the service criteria for the requested data service, the edge device can be selected for the data service. When metrics for multiple edge devices meet the service criteria, the edge device with a highest or lowest ranked metric (e.g., lowest latency parameter, or predicted latency, shorted distance to client system location, highest computing power metric, and the like) can be selected for the requested data service.

At block 918, process 900 can initialize resources loaded at the selected edge device and initialize the client system for offloading visual frames. For example, loaded workload resources and a software engine (e.g., effects engine) can be initialized such that the resources are configured to receive and process offloaded visual frames. The client system can be transmitted the network location, identifier, and/or other information for establishing a real-time communication session with the selected edge device.

At block 920, process 900 can instruct the client system to perform the requested data service on-device. For example, when an edge device with metrics that meet the service criteria is not available, the client system can be instructed to perform the data services on-device or at a cloud device. In some implementations, the data service may be unavailable at the client system until an edge device or a gateway device is found that can provide the data service.

Blocks 922-928 of process 923 represent the flow for a client system. At block 922, process 923 can receive a stream of visual frames at a client system. For example, the client system can be a smartphone, smart speaker with a display, wearable device with a display, XR device, or any other suitable client computing device. The stream of visual frames can be camera frames captured by one or more cameras at or in communication with the client system. In some implementations, an application (e.g., streaming video application, XR application, and the like) running at the client system can receive the stream of visual frames.

At block 924, process 923 can offload a portion of the visual frames to a gateway device/edge device. For example, the client system receives a designation of the gateway device/edge device network location from the cloud system. The client system can establish a real-time connection (e.g., WebRTC session, wireless communication protocol session) with the gateway device/edge device and offload the portion of camera frames over the established connection. The visual frames can be offloaded to the gateway device/edge device over the real-time connection for performance of a workload.

At block 926, process 923 can receive the processed camera frames at the client system. The gateway device/edge device can return the processed camera frames to the client system over the established real-time connection. At block 928, process 923 can display the processed camera frames (e.g., as a streaming video at the client system). For example, an application (e.g., running at the client system) can display the processed camera frames. In some implementations, the capturing of the camera frames (e.g., using the one or more camera) and the displaying of the processed camera frames occurs in real-time.

Blocks 930-938 of process 929 represent the flow for a gateway device/edge device. At block 930, process 929 can receive workload resources at the gateway device/edge device. For example, a software engine (e.g., effects engine) and one or more workload resources can be preloaded or dynamically loaded at the gateway device/edge device.

At block 932, process 929 can initialize loaded resources at the gateway device/edge device. For example, loaded workload resources and a software engine can be initialized such that the resources are configured to receive and process offloaded visual frames At block 934, process 929 can receive offloaded frames from a client system. For example, the client device can establish a real-time communication session with the gateway device/edge device and offload streaming visual frames over the real-time communication session.

At block 936, process 929 can process the visual frames at the gateway device/edge device using a workload resource. For example, a given workload resource can be configured to perform one or more workloads that correspond to the requested data service. The gateway device/edge device can implement the software components and workload resources to perform the workload on the visual frames that corresponds to the requested data service.

At block 938, process 929 can transmit the processed frames from the gateway device/edge device to the client system. For example, once the workload resource and software component are used to process the visual frames (e.g., render visual frames with an augmentation), the processed frames can be transmitted back to the client system over the established real-time communication session.

In some implementations, when a gateway device does not meet the resource criteria for a data service (e.g., is not preloaded with a corresponding workload resource), and a workload resource is dynamically loaded to the gateway device, a temporary edge device can be selected for the data service. For example, process 900 can select an edge device when the metrics for the located gateway device do not meet the service criteria. In some implementations, the selected edge device can be a temporary selection until the gateway device is dynamically loaded with the corresponding workload resource and initialized to provide the requested data service. The data service can be in-progress and a handover can be performed from the temporary edge device to the gateway device according to the functionality described with reference to FIGS. 10 and 11.

Figure 10:
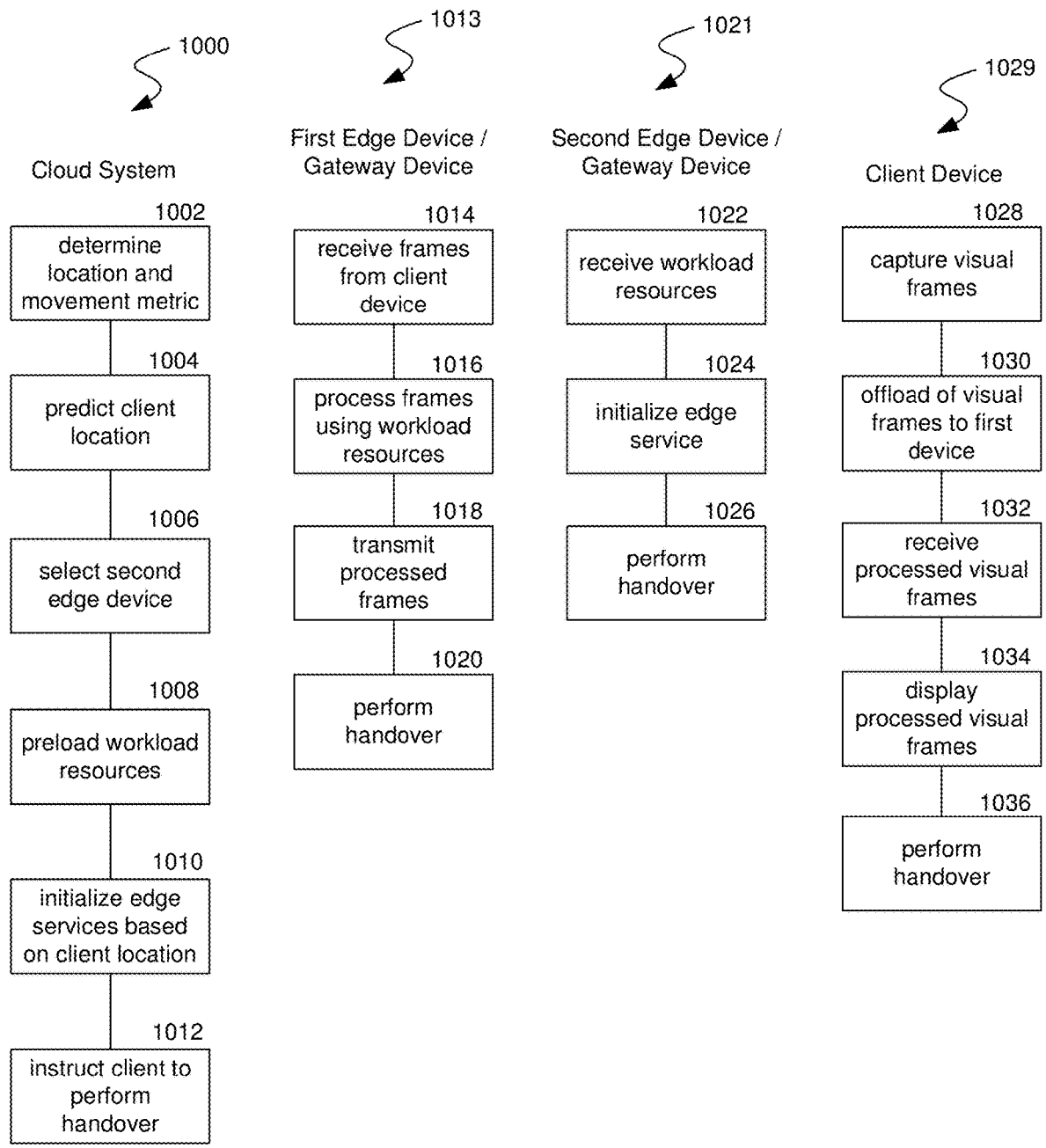
FIG. 10 illustrates a set of flow diagrams for processes used in some implementations of the present technology for configuring components to perform a handover of edge data services.

FIG. 10 illustrate a set of flow diagrams for processes used in some implementations of the present technology for configuring components to perform a handover of edge data services. In some implementations, processes 1000, 1013, 1021 and 1029 can be performed based on detection of handover conditions for an in-progress data service. In some implementations, processes 1000, 1013, 1021 and 1029 can be performed in real-time such that streaming visual frames can be received, offloaded, processed, returned, and displayed.

Processes 1000, 1013, 1021 and 1029 include flows for a cloud system, first gateway device/edge device, second gateway/edge device, and client system. The process 1000 for the cloud system includes blocks 1002-1012, the process 1013 for the first edge device/gateway device includes blocks 1014-1020, the process 1021 for the second edge device/gateway device includes blocks 1022-1026, and the process 1029 for the client system includes blocks 1028-

1036. In some implementations, the first gateway device or edge device can provide in-progress data services to the client system.

At block 1002, process 1000 can determine a movement metric and location for a client system. For example, multiple client system locations can be stored over a period of time. The system locations over the period of time can represent a change in distance for the client system. The change in distance and period of time can be used to generate a rate of change (e.g., speed). In addition, the stored locations can also be used to discern a directional component for the speed. Together, the direction and speed can be used to generate a velocity metric for the client system. Any other suitable technique for determining a velocity vector can be implemented.

At block 1004, process 1000 can predict a client system location based on the movement metric. For example, the predicted location can be a location predicted for the client system at a future point in time (e.g., in 10 seconds, 15 second, 30 second, 1 minute, 2 minutes, and the like) according to the determine velocity metric. The predicted location can be a location point or a predicted region for the client system.

At block 1006, process 1000 can select a second gateway device/edge device based on the predicted location for the client system. For example, the selected second gateway device/edge device can be proximate to the predicted location (e.g., within a threshold distance), can be a gateway device that serves an access node (e.g., wireless network access node) proximate to the predicted location, or can be selected according to the predicted location for the client system for any other suitable reason.

At block 1008, process 1000 can preload workload resources at the selected second gateway device/edge device. For example, a software engine (e.g., effects engine) and one or more workload resources can be preloaded or dynamically loaded at the second gateway device/edge device. In some implementations, a workload resource that corresponds to the in-progress data service can be preloaded to the second gateway device/edge device.

At block 1010, process 1000 can initialize resources at the second gateway device/edge device when the client system is in range of the predicted location. For example, loaded workload resources and a software engine can be initialized such that the resources at the second gateway device/edge device are configured to receive and process offloaded visual frames.

The resources can be initialized in response to a determination that the client system is at or within a range of the predicted location. For example, it can be detected that the client system is located at (e.g., within a predefined range of) the predicted location at (or within a threshold time from) the future point in time and/or within the predicted region at (or within a threshold time from) the future point in time.

At block 1012, process 1000 can instruct the client system to perform a handover form the first gateway device/edge device to the second gateway device/edge device. Processes 1100, 1129, and 1139 of FIG. 11 describe a handover flow for the client system, first gateway device/edge device, and second gateway device/edge device.

Blocks 1014-1020 of process 1013 represent the flow for a first gateway device/edge device. At block 1014, process 1013 can receive offloaded visual frames from a client system. For example, the offloaded visual frames can be part of an in-progress data service that the first gateway device/ edge device is performing for the client system. At block 1016, process 1013 can process visual frames using the workload resources. For example, the first gateway device/ edge device can process the offloaded visual frames with a workload resource that corresponds to the in-progress data service.

At block 1018, process 1013 can transmit the processed frames to the client system. For example, once the offloaded visual frames are processed using the workload resource (e.g., rendered with an augment corresponding to the in-progress data service), the processed visual frames can be transmitted back to the client system.

At block 1020, process 1013 can perform a handover of the data services from the first gateway device/edge device to the second gateway device/edge device. Process 1129 of FIG. 11 describes a handover flow for the first gateway device/edge device.

Blocks 1022-1026 of process 1021 represent the flow for a second gateway device/edge device. At block 1022, process 1021 can receive workload resources at the second gateway device/edge device. For example, a software engine (e.g., effects engine) and one or more workload resources can be preloaded or dynamically loaded at the second gateway device/edge device. In some implementations, a workload resources that corresponds to the in-progress data service can be preloaded to the second gateway device/edge device (in anticipation of a handover).

At block 1024, process 1021 can initialize resources preloaded to the second gateway device/edge device. For example, a software engine and one or more workload resources can be initialized to receive and process visual frames. The resources can be initialized in response to a determination that the client system is at or within a range of the predicted location. For example, it can be detected that the client system is located at (e.g., within a predefined range of) the predicted location at (or within a threshold time from) the future point in time and/or within the predicted region at (or within a threshold time from) the future point in time.

At block 1026, process 1021 can perform a handover of the data services from the first gateway device/edge device to the second gateway device/edge device. Process 1139 of FIG. 11 describes a handover flow for the first gateway device/edge device.

Blocks 1028-1036 of process 1029 represent the flow for a client system. At block 1028, process 1029 can receive a stream of visual frames at the client system. For example, the client system can be a smartphone, smart speaker with a display, wearable device with a display, XR device, or any other suitable client computing device. The stream of visual frames can be camera frames captured by one or more cameras at or in communication with the client system. In some implementations, an application (e.g., streaming video application, XR application, and the like) running at the client system can receive the stream of visual frames.

At block 1030, process 1029 can offload a portion of the visual frames to the first gateway device/edge device. For example, the client system can maintain a real-time connection (e.g., WebRTC session, wireless communication protocol session) with the first gateway device/edge device and offload the portion of camera frames over the established connection. The visual frames can be offloaded to the first gateway device/edge device over the real-time connection for performance of a workload.

At block 1032, process 1029 can receive the processed camera frames at the client system. The first gateway device/edge device can return the processed visual frames (e.g., processed using a workload resource) to the client system over the established real-time connection. At block 1034, process 1029 can display the processed camera frames (e.g., as a streaming video at the client system). For example, an application (e.g., running at the client system) can display the processed visual frames. In some implementations, the capturing of the visual frames (e.g., using the one or more camera) and the displaying of the processed visual frames occurs in real-time.

At block 1036, process 1029 can perform a handover of the data services from the first gateway device/edge device to the second gateway device/edge device. Process 1100 of FIG. 11 describes a handover flow for the client system.

Figure 11:
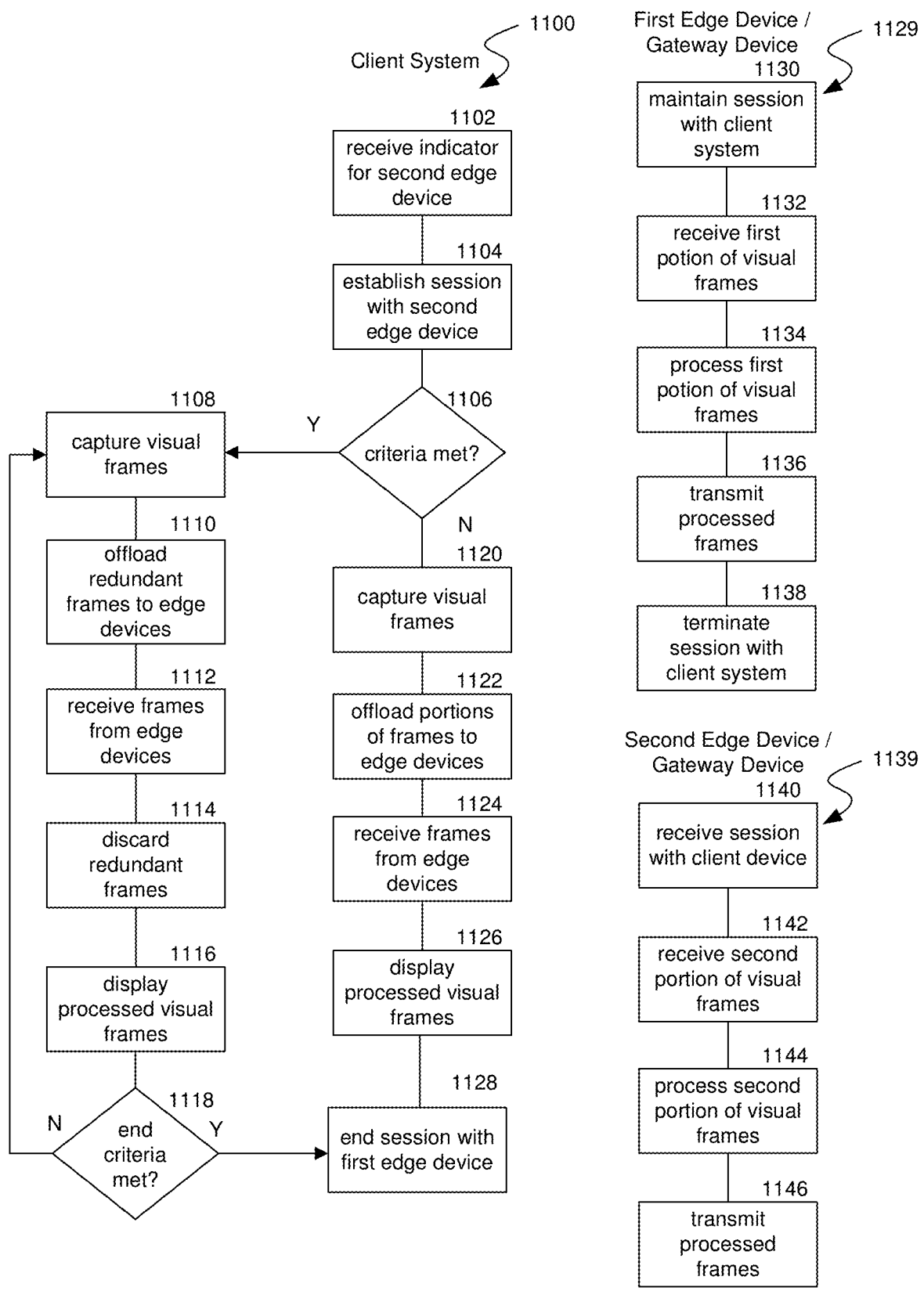
FIG. 11 illustrates a set of is a flow diagrams for processes used in some implementations of the present technology for performing a handover of edge data services.

FIG. 11 illustrates a set of flow diagrams for processes used in some implementations of the present technology for performing a handover of edge data services. In some implementations, processes 1100, 1129, and 1139 can be performed based on detection of handover conditions for an in-progress data service. In some implementations, processes 1100, 1129, and 1139 can be performed in real-time such that streaming visual frames can be received, offloaded, processed, returned, and displayed.

Processes 1100, 1112, and 1139 include flows for a client system, first gateway device/edge device, and second gateway/edge device. The process 1100 for the client system includes blocks 1102-1128, the process 1129 for the first edge device/gateway device includes blocks 1130-1138, and the process 1139 for the second edge device/gateway device includes blocks 1140-1146.

At block 1102, process 1100 can receive an indicator for the second gateway device/edge device. For example, the client system can receive a network location for the target device (e.g., second gateway device/edge device that is the target of the handover). At block 1104, process 1100 can establish a real-time communication session with the second gateway device/edge device. Using the network location, the client system can establish a real-time communication session (e.g., WebRTC, wireless communication protocol real-time session, and the like) with the target device.

At block 1106, process 1100 can determine whether a redundancy criteria is met. For example, the redundancy criteria can include service criteria for the in-progress data service (e.g., latency threshold, dropped visual frame threshold, resolution threshold, data rate threshold, and the like) and/or a speed threshold for the movement metric of the client system. For example, a data service with a relatively stringent latency threshold may meet the redundancy criteria because the redundant visual frames can mitigate the risk of the latency falling below the threshold. In addition, a relatively stringent dropped frame threshold, resolution threshold, and/or data rate threshold may also meet the redundancy criteria because the redundant visual frames can mitigate the risk of data service performance falling below these thresholds. In another example, a client system speed above a threshold may indicate changing conditions that can benefit from redundant visual frame processing.

When the redundancy criteria is met, process 1100 can progress to block 1108. When the redundancy criteria is not met, process 1100 can progress to block 1120.

At block 1108, process 1100 can capture visual frames at the client system. For example, the client system can be a smartphone, smart speaker with a display, wearable device with a display, XR device, or any other suitable client computing device. The stream of visual frames can be camera frames captured by one or more cameras at or in communication with the client system. In some implementations, an application (e.g., streaming video application, XR application, and the like) running at the client system can receive the stream of visual frames.

At block 1110, process 1100 can offload redundant frames to the first and second devices. For example, the client system can have established real-time connections with the first gateway device/edge device and the second gateway device/edge device. A first portion of visual frames can be offloaded to the first gateway device/edge device over the real-time connection for performance of the workload and a second portion of visual frames can be offloaded to the second gateway device/edge device over the real-time connection for performance of the workload. In an example, the second portion may be after the first portion temporally.

The first portion and second portion can share a percentage of redundant visual frames (e.g., 5%, 10%, 20%, and the like). For example, the percentage of redundant frames can be based on the service criteria for the in-progress data service and/or the speed of the client system. In some implementations, the percentage of redundant frames is a first number for a first data service latency threshold and a second number for a second data service latency threshold, where the first latency threshold is lower than the second latency threshold and the first number of redundant frames is higher than the second number of redundant frames. In some implementations, the first portion and second portion of visual frames are substantially equal in the number of visual frames. In another example, the first portion has more visual frames than the second portion or the second portion has more visual frames than the first portion.

At block 1112, process 1100 can receive the processed frames from the first gateway device/edge device and the second gateway device/edge device. For example, the frames can be processed at the first and second devices using a workload resource that corresponds to the in-progress data service. At block 1114, process 1100 can discard redundant processed frames. For example, one or more processed visual frames may be redundant because a percentage of redundant frames were sent to both the first and second devices. Any redundant processed frames can be discarded.

At block 1116, process 1100 can display processed visual frames at the client system. For example, the processed visual frames can be displayed by an application running at the client system as streaming video. At block 1118, process 1100 can determine whether a termination criteria is met. For example, the termination criteria can be a latency criteria for communication with the second gateway device/edge device (e.g., below a threshold latency, is less than a latency for communication with the first device, and the like). When the termination criteria is met, process 1100 progresses to block 1128. When the termination criteria is not met, process 1100 loops back to block 1108, where additional visual frames are captured at the client system.

At block 1128, process 1100 can terminate the real-time communication session with the first gateway device/edge device. For example, once the termination criteria is met it is determined that the in-progress data service will be performed by the second gateway device/edge device, and thus the real-time session with the first gateway device/edge device can be terminated.

At block 1120, process 1100 can capture visual frames at the client system. The stream of visual frames (e.g., video) can be camera frames captured by one or more cameras at or in communication with the client system. At block 1122, process 1100 can offload frames to the first and second devices. For example, the client system can have established real-time connections with the first gateway device/edge device and the second gateway device/edge device. A first portion of visual frames can be offloaded to the first gateway device/edge device over the real-time connection for performance of the workload and a second portion of visual frames can be offloaded to the second gateway device/edge device over the real-time connection for performance of the workload. In an example, the second portion may be after the first portion temporally.

At block 1124, process 1100 can receive the processed frames from the first gateway device/edge device and the second gateway device/edge device. For example, the frames can be processed at the first and second devices using a workload resource that corresponds to the in-progress data service. At block 1126, process 1100 can display processed visual frames at the client system. For example, the processed visual frames can be displayed by an application running at the client system as streaming video. From block 1124, process 1100 can progress to block 1128, where the real-time communication session with the first gateway device/edge device can be terminated.

Blocks 1130-1138 of process 1129 represent the flow for the first gateway device/edge device. At block 1130, process 1129 maintains the real-time communication session with the client system. The real-time communication session is used to offload visual frames from the client system to the first gateway device/edge device and transmit processed frames back to the client system (e.g., to perform the in-progress data service).

At block 1134, process 1129 can receive a first portion of offloaded visual frames from a client system. At block 1136, process 1129 can process the first portion of offloaded visual frames at the first gateway device/edge device using a workload resource. For example, a software engine (e.g., effects engine) and a workload resource that corresponds to the in-progress data service can be used to process the first portion of visual frames (e.g., render augmented visual frames).

At block 1136, process 1129 can transmit the first portion of processed frames from the first gateway device/edge device to the client system. For example, once the workload resource and software component are used to process the first portion of visual frames (e.g., render visual frames with an augmentation), the processed frames can be transmitted back to the client system over the established real-time communication session.

At block 1136, process 1129 can terminate the session with the client system. For example, the client system can determine that a termination criteria has been met and terminate the real-time communication session with the first gateway device/edge device.

Blocks 1140-1146 of process 1139 represent the flow for the second gateway device/edge device. At block 1140, process 1139 can receive a real-time communication session connection with the client system. For example, the client system can receive a network location for the second gateway device/edge device that is the target of the handover. Using the network location, the client system can establish a real-time communication session (e.g., WebRTC, wireless communication protocol real-time session, and the like) with the second gateway device/edge device.

At block 1142, process 1139 can receive a second portion of offloaded visual frames from a client system. At block 1144, process 1139 can process the second portion of offloaded visual frames at the second gateway device/edge device using a workload resource. For example, a software engine (e.g., effects engine) and a workload resource that corresponds to the in-progress data service can be used to process the second portion of visual frames (e.g., render augmented visual frames).

At block 1146, process 1139 can transmit the second portion of processed frames from the second gateway device/edge device to the client system. For example, once the workload resource and software component are used to process the second portion of visual frames (e.g., render visual frames with an augmentation), the processed frames can be transmitted back to the client system over the established real-time communication session.

Implementations of FIGS. 10 and 11 (e.g., processes 1000, 1013, 1021, 1029, 1100, and/or 1129) can perform a handover of an in-progress data service without interruption to the data service and/or with minimal impact. For example, the in-progress data service can process visual frames offloaded from a client system, where the visual frames are captured at the client system and the processed visual frames (processed at a gateway device/edge device) are displayed at the client system as streaming video. The video stream supported by the in-progress data service includes certain service parameters, such as resolution, frame rate, dropped frame rate, lag, jitter, and the like. In some implementations, a handover of the in-progress data service can support limited (or no) impact on the service parameters for the video stream supported by the in-progress data service. For example, during handover of the in-progress data service the streaming video can maintain a minimal service level for the service parameters (e.g., minimum resolution, frame rate, dropped frame rate, lag, jitter, and the like).

Figure 12:
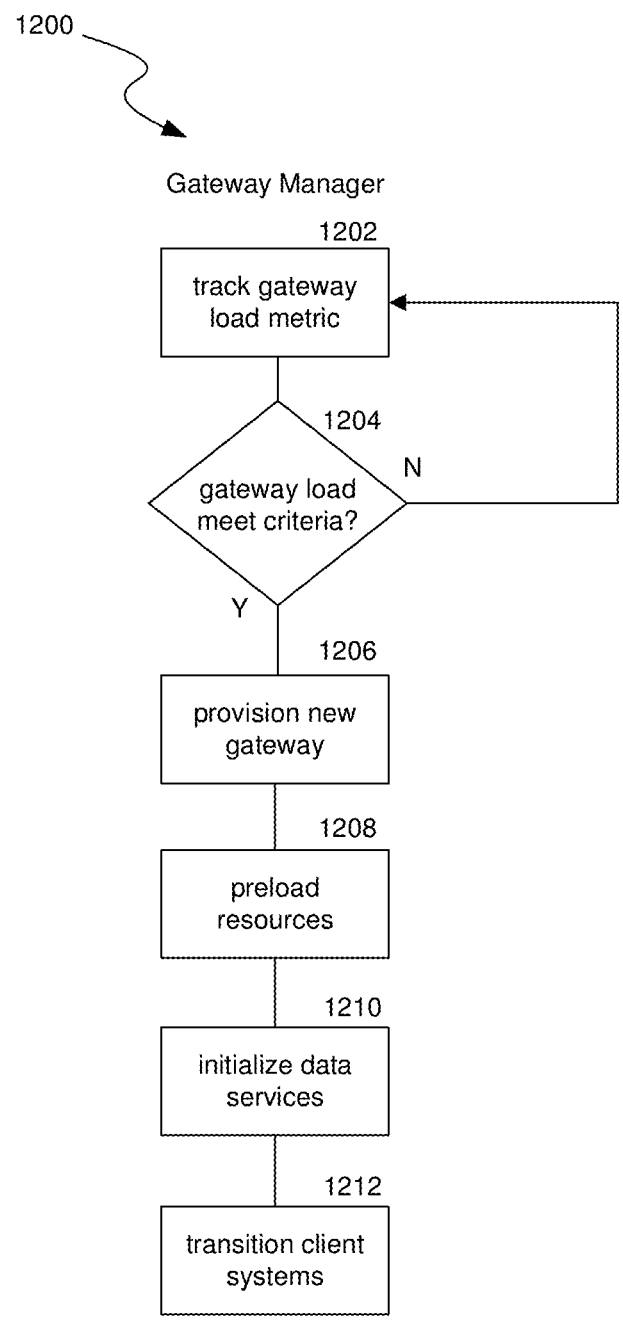
FIG. 12 is a flow diagram illustrating a process used in some implementations of the present technology for managing edge data services deployed to gateway devices.

FIG. 12 is a flow diagram illustrating a process used in some implementations of the present technology for managing edge data services deployed to gateway devices. In some implementations, processes 1200 can be performed by a gateway manager to provision a new gateway service.

At block 1202, process 1200 can track a load metric for a gateway device. Example load metrics for the gateway device include processor utilization, memory utilization, client system connection load, and other suitable load metrics. In some implementations, the gateway manager queries gateway devices to retrieve health information about the gateway devices, including the load metric(s).

At block 1204, process 1200 can determine whether the load metric meets a load criteria. For example, the load metric(s) (e.g., processor utilization, memory utilization, number of client system logical connections) can be compared to load criteria (e.g., processor threshold, memory threshold, threshold number of client system logical connections). When the load criteria is met, process 1200 progresses to block 1206. When the load criteria is not met, process 1200 loops back to block 1202, where the gateway load continues to be monitored.

At block 1206, process 1200 can provision a new gateway. For example, when the load on the existing gateway reaches the load criteria the gateway manager can trigger the provisioning of a new gateway. The new gateway can be provisioned at a server or other suitable network connected computing device with available computing resources.

At block 1208, process 1200 can preload a software engine and workload resources at the new gateway. In some implementations, a subset of the client system connections for the existing gateway device can be selected for transitioning to the newly provisioned gateway. Based on the subset of client systems selected, the newly provisioned gateway can be preloaded with resources (e.g., effects engine, workload resources, and the like).

For example, a usage history of data services can be stored at/for the client systems. In some implementations, one or more applications at the client system can request the data services, and the data service usage history for each application can be stored at the client system. Workload resources can be preloaded to the newly provisioned gateway service when one of more of the subset of the client systems with connections selected for transitioning are currently receiving a data service corresponding to the workload resource (e.g., comprises a data service in-progress, at the existing gateway device or an edge device) or a threshold number of the client systems within the subset have a usage history that includes a data service that corresponds to the workload resource.

At block 1210, process 1200 can initialize the software engine and workload resources at the newly provisioned gateway. For example, loaded workload resources and a software engine (e.g., effects engine) can be initialized such that the resources are configured to receive and process offloaded visual frames.

At block 1212, process 1200 can transition the set of client systems to the newly provisioned gateway. For example, transitioning the set of client systems can include moving an endpoint for a logical connection associated with the client systems from the exiting gateway device to the newly provisioned gateway device. Some transitioning client systems can have data services that are in-progress (e.g., via the existing gateway device or another edge device) and a handover can be performed from the existing gateway device/edge device to the newly provisioned gateway device according to the functionality described with reference to FIGS. 10 and 11.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for performing a handover of edge data services, the method comprising:
   providing an edge data service to a wireless device using a first edge device, wherein the wireless device is configured to offload visual frames to the first edge device over a wireless network, and the first edge device is configured to process the visual frames using a workload resource and return the processed visual frames, to the wireless device over the wireless network;
   determining a predicted location based on a movement metric for the wireless device;
   selecting a second edge device for providing the edge data service to the wireless device according to the predicted location;
   initializing edge data services at the second edge device using preloaded workload resources at the second edge device; and
   performing, in response to a determination of the wireless device moving to the predicted location, a handover of the edge data service from the first edge device to the second edge device, wherein, after the handover, the wireless device is configured to offload visual frames to the second edge device over the wireless network, and the second edge device is configured to process the visual frames and return the processed visual frames, to the wireless device over the wireless network, for display.

2. The method of claim 1, wherein selecting the second edge device further comprises:
   comparing a service criteria for the edge data service to service metrics for a plurality of candidate edge devices; and
   selecting the second edge device from among the candidate edge devices according to the comparison.

3. The method of claim 2, wherein the service metrics comprise one or more of a latency parameter, a processor utilization, an edge resource listing, or a combination thereof.

4. The method of claim 2, wherein the candidate edge devices comprise at least the second edge device and an additional edge device, and a latency parameter for the second edge device is lower than a latency parameter for the additional edge device.

5. The method of claim 2, wherein the candidate edge devices comprise at least the second edge device and an additional edge device, and an edge resource listing for the second edge device matches the service criteria while an edge resource listing for the additional edge device fails to match the service criteria.

6. The method of claim 1, wherein, during performance of the handover, the client system is configured to offload a first portion of visual frames to the first edge device and a second portion of visual frames to the second edge device.

7. The method of claim 6, wherein the first portion of visual frames and the second portion of visual frames comprise one or more redundant visual frames.

8. The method of claim 7, wherein a number of redundant frames within the first portion of visual frames and the second portion of visual frames is determined based on a service criteria for the edge data service.

9. The method of claim 1, wherein at least one workload resources at the first edge device, when used to process the offloaded visual frames, is configured to:
perform object tracking for objects in the visual frames,
generate overlays, masks, images, or three-dimensional volumes for augmenting the visual frames,
perform artificial reality video processing for the processed visual frames,
perform three-dimensional mapped environment video processing for the processed visual frames, or
any combination thereof.

10. A computing system for performing a handover of edge data services, the computing system comprising:
one or more processors; and
one or more memories storing instructions that, when executed by the one or more processors, cause the computing system to perform a process comprising:
providing an edge data service to a wireless device using a first edge device, wherein the wireless device is configured to offload visual frames to the first edge device over a wireless network, and the first edge device is configured to process the visual frames using a workload resource and return the processed visual frames, to the wireless device over the wireless network;
determining a predicted location based on a movement metric for the wireless device;
selecting a second edge device for providing the edge data service to the wireless device according to the predicted location;
initializing edge data services at the second edge device using preloaded workload resources at the second edge device; and
performing, in response to a determination of the wireless device moving to the predicted location, a handover of the edge data service from the first edge device to the second edge device.

11. The computing system of claim 10, wherein selecting the second edge device further comprises:
comparing a service criteria for the edge data service to service metrics for a plurality of candidate edge devices; and
selecting the second edge device from among the candidate edge devices according to the comparison.

12. The computing system of claim 11, wherein the service metrics comprise one or more of a latency parameter, a processor utilization, an edge resource listing, or a combination thereof.

13. The computing system of claim 11, wherein the candidate edge devices comprise at least the second edge device and an additional edge device, and a latency parameter for the second edge device is lower than a latency parameter for the additional edge device.

14. The computing system of claim 11, wherein the candidate edge devices comprise at least the second edge device and an additional edge device, and an edge resource listing for the second edge device matches the service criteria while an edge resource listing for the additional edge device fails to match the service criteria.

15. The computing system of claim 10, wherein, during performance of the handover, the client system is configured to offload a first portion of visual frames to the first edge device and a second portion of visual frames to the second edge device.

16. The computing system of claim 15, wherein the first portion of visual frames and the second portion of visual frames comprise one or more redundant visual frames.

17. The computing system of claim 16, wherein a number of redundant frames within the first portion of visual frames and the second portion of visual frames is determined based on a service criteria for the edge data service.

18. The computing system of claim 10, wherein at least one workload resources at the first edge device, when used to process the offloaded visual frames, is configured to:
perform object tracking for objects in the visual frames,
generate overlays, masks, images, or three-dimensional volumes for augmenting the visual frames,
perform artificial reality video processing for the processed visual frames,
perform three-dimensional mapped environment video processing for the processed visual frames, or
any combination thereof.

19. A non-transitory computer-readable storage medium storing instructions that, when executed by a computing system, cause the computing system to perform a handover of edge data services, the process comprising:
providing an edge data service to a wireless device using a first edge device, wherein the wireless device is configured to offload visual frames to the first edge device over a wireless network, and the first edge device is configured to process the visual frames using a workload resource and return the processed visual frames, to the wireless device over the wireless network;
determining a predicted location based on a movement metric for the wireless device;
selecting a second edge device for providing the edge data service to the wireless device according to the predicted location;
initializing edge data services at the second edge device using preloaded workload resources at the second edge device; and
performing, in response to a determination of the wireless device moving to the predicted location, a handover of the edge data service from the first edge device to the second edge device.

20. The non-transitory computer-readable storage medium of claim 19, wherein, during performance of the handover, the client system is configured to offload a first portion of visual frames to the first edge device and a second portion of visual frames to the second edge device.

* * * * *